US011176968B2

(12) United States Patent
Miyamura et al.

(10) Patent No.: US 11,176,968 B2
(45) Date of Patent: Nov. 16, 2021

(54) BUFFERED WRITING OF DATASETS AND END LONGITUDINAL POSITIONS (END LPOSS) ON A MAGNETIC RECORDING TAPE AND VALIDATING THE END LPOSS DURING READING OF A LATER DATASET THEREAFTER

(71) Applicant: International Business Machines Corporation, Armonk, NY (US)

(72) Inventors: Tsuyoshi Miyamura, Yokohama (JP); Setsuko Masuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 16/660,612

(22) Filed: Oct. 22, 2019

(65) Prior Publication Data
US 2021/0118470 A1   Apr. 22, 2021

(51) Int. Cl.
| G11B 27/30 | (2006.01) |
| G11B 5/008 | (2006.01) |
| G11B 5/02 | (2006.01) |
| G06F 12/0868 | (2016.01) |
| G05B 19/045 | (2006.01) |
| G11B 20/12 | (2006.01) |
| G05B 19/042 | (2006.01) |
| G11B 27/00 | (2006.01) |

(52) U.S. Cl.
CPC .......... *G11B 27/309* (2013.01); *G05B 19/042* (2013.01); *G05B 19/045* (2013.01); *G06F 12/0868* (2013.01); *G11B 5/00821* (2013.01); *G11B 5/02* (2013.01); *G11B 20/1205* (2013.01); *G11B 27/00* (2013.01); *G05B 2219/23416* (2013.01); *G05B 2219/36117* (2013.01); *G06F 2212/213* (2013.01)

(58) Field of Classification Search
None
See application file for complete search history.

(56) References Cited

U.S. PATENT DOCUMENTS

| 8,687,473 B2 | 4/2014 | Katagiri |
| 9,324,358 B2 | 4/2016 | Fujihara et al. |
| 9,685,179 B2 | 6/2017 | Tsukahara et al. |

(Continued)

FOREIGN PATENT DOCUMENTS

JP      2015049709 A      3/2015

*Primary Examiner* — Craig A. Renner
(74) *Attorney, Agent, or Firm* — Zilka-Kotab, P.C.

(57) ABSTRACT

An apparatus according to one embodiment includes a controller configured to control writing operations to a magnetic recording tape, and logic integrated with and/or executable by the controller for causing the controller to receive a plurality of records, store datasets associated with the plurality of records in a buffer memory, and write the datasets stored in the buffer memory to the magnetic recording tape in response to a predetermined number of datasets being stored in the buffer memory. For each of the datasets being written, an end longitudinal position indicative of a physical position where the dataset is physically written to the magnetic recording tape is determined. Moreover, for each determined end longitudinal position, the end longitudinal position and an identifier of the associated dataset are stored to a table of a dataset that is to be subsequently written to the magnetic recording tape.

19 Claims, 15 Drawing Sheets

(56) References Cited

U.S. PATENT DOCUMENTS

| | | | |
|---|---|---|---|
| 10,229,718 B1* | 3/2019 | Hasegawa et al. | G11B 27/107 |
| 2010/0033869 A1* | 2/2010 | Oishi et al. | G11B 5/584 |
| | | | 360/78.02 |
| 2011/0261480 A1* | 10/2011 | Fujihara et al. | G11B 27/3027 |
| | | | 360/55 |
| 2016/0012844 A1* | 1/2016 | Nylander-Hill | G11B 27/36 |
| | | | 369/53.42 |
| 2017/0153820 A1* | 6/2017 | Hasegawa et al. | G06F 3/0686 |
| 2017/0153823 A1* | 6/2017 | Hasegawa et al. | G06F 3/0682 |
| 2019/0163376 A1 | 5/2019 | Abe et al. | |

* cited by examiner

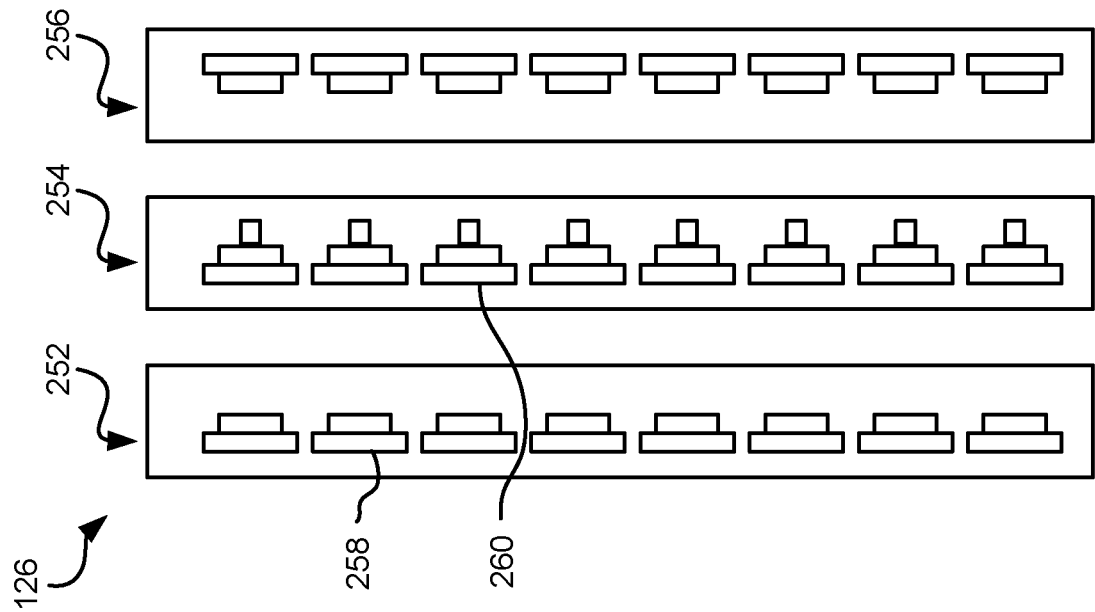
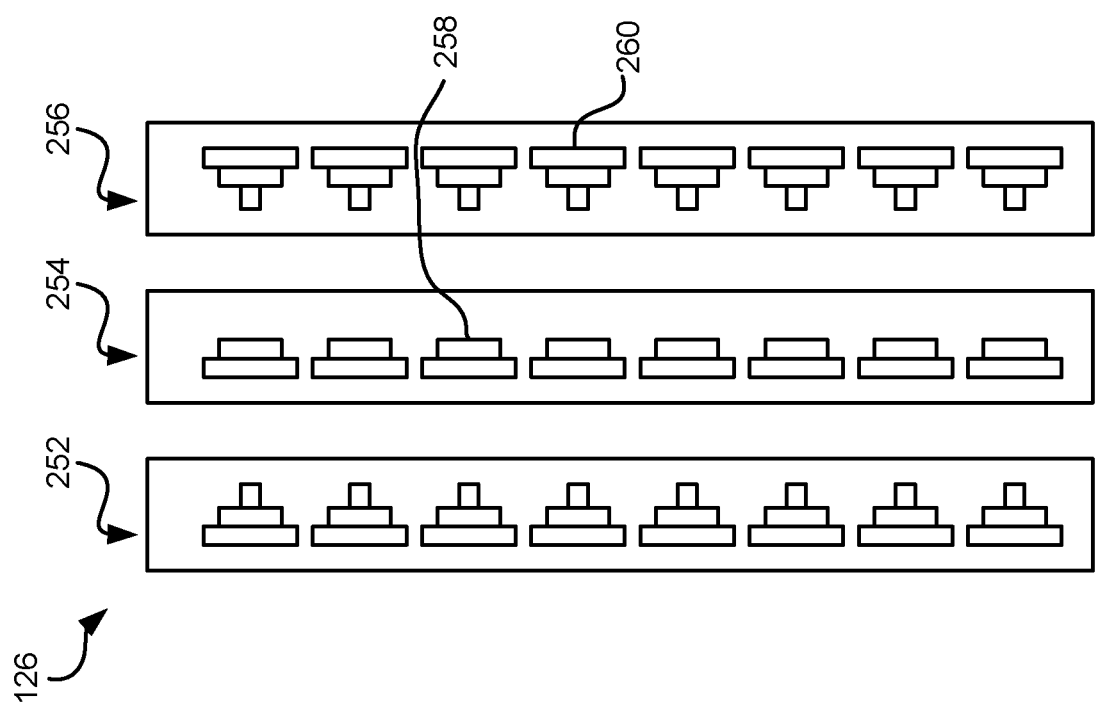

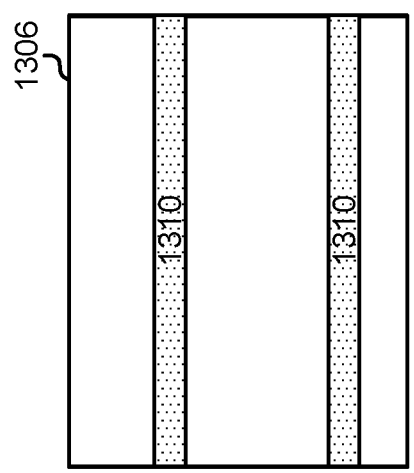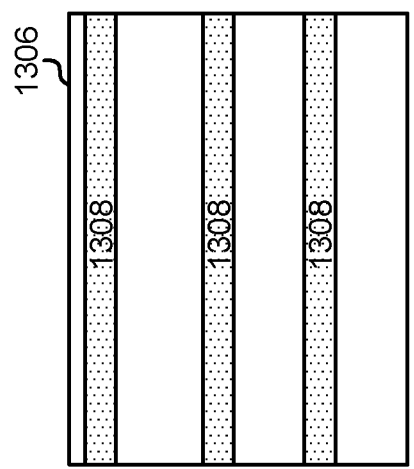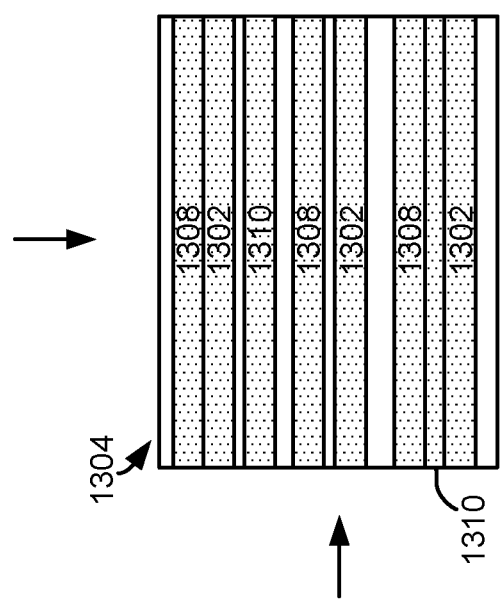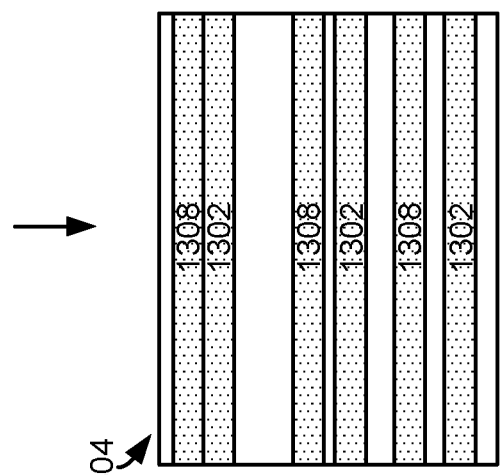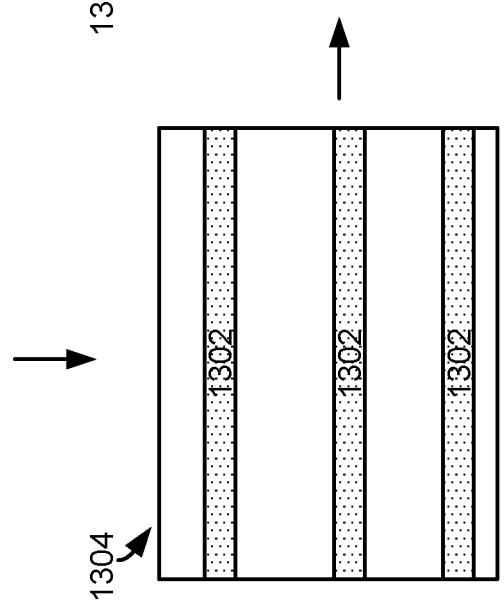

US 11,176,968 B2

BUFFERED WRITING OF DATASETS AND END LONGITUDINAL POSITIONS (END LPOSS) ON A MAGNETIC RECORDING TAPE AND VALIDATING THE END LPOSS DURING READING OF A LATER DATASET THEREAFTER

BACKGROUND

The present invention relates to data storage systems, and more particularly, this invention relates to storage of datasets on magnetic recording tape.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with tape dimensional instability.

SUMMARY

An apparatus according to one embodiment includes a controller configured to control writing operations to a magnetic recording tape, and logic integrated with and/or executable by the controller for causing the controller to receive a plurality of records, and store datasets associated with the plurality of records in a buffer memory. The logic is furthermore integrated with and/or executable by the controller for causing the controller to write the datasets stored in the buffer memory to the magnetic recording tape in response to a predetermined number of datasets being stored in the buffer memory. For each of the datasets being written, an end longitudinal position indicative of a physical position where the dataset is physically written to the magnetic recording tape is determined. Moreover, for each determined end longitudinal position, the end longitudinal position and an identifier of the associated dataset are stored to a table of a dataset that is to be subsequently written to the magnetic recording tape.

A computer-implemented method according to another embodiment includes receiving a plurality of records, storing datasets associated with the plurality of records in a buffer memory, and writing the datasets stored in the buffer memory to a magnetic recording tape in response to a predetermined number of datasets being stored in the buffer memory. For each of the datasets being written, an end longitudinal position indicative of a physical position where the dataset is physically written to the magnetic recording tape is determined. Moreover, for each determined end longitudinal position, the end longitudinal position and an identifier of the associated dataset are stored to a table of a dataset that is to be subsequently written to the magnetic recording tape.

A computer program product for buffered writing of datasets and end longitudinal positions on a magnetic recording tape and validating the end longitudinal positions during reading of a later dataset thereafter according to another embodiment includes a computer readable storage medium having program instructions embodied therewith. The program instructions are readable and/or executable by a controller to cause the controller to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 13A illustrates a first attempt of a tape drive to read a portion of a magnetic recording tape, during which only some of the data rows written on the portion are successfully read, in accordance with one embodiment.

FIG. 13B illustrates a representation of a copy and paste buffer storing the data rows successfully read in the first attempt of FIG. 13A.

FIG. 13C illustrates a second attempt at reading the portion of the magnetic recording tape after changing settings of the tape drive.

FIG. 13D illustrates a representation of the copy and paste buffer storing the data rows successfully read in the second attempt of FIG. 13C, along with the data rows successfully read in the read attempt of FIG. 13A.

FIG. 13E illustrates a third attempt at reading the portion of the magnetic recording tape after changing settings of the tape drive after the read attempt of FIG. 13C.

FIG. 13F illustrates a representation of the copy and paste buffer storing the data rows successfully read in the third attempt of FIG. 13E, along with the data rows previously successfully read in the read attempts of FIGS. 13A and 13C.

DETAILED DESCRIPTION

Figure 1A:
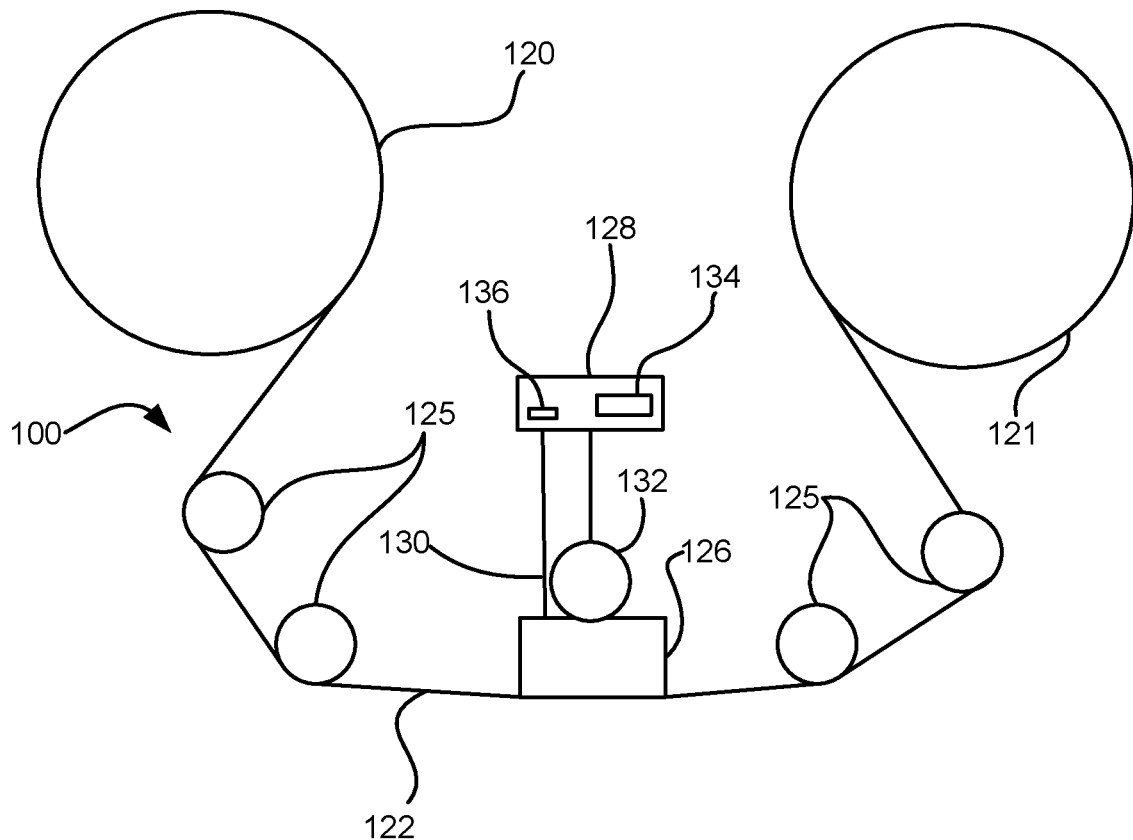
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes a controller configured to control writing operations to a magnetic recording tape, and logic integrated with and/or executable by the controller for causing the controller to receive a plurality of records, and store datasets associated with the plurality of records in a buffer memory. The logic is furthermore integrated with and/or executable by the controller for causing the controller to write the datasets stored in the buffer memory to the magnetic recording tape in response to a predetermined number of datasets being stored in the buffer memory. For each of the datasets being written, an end longitudinal position indicative of a physical position where the dataset is physically written to the magnetic recording tape is determined. Moreover, for each determined end longitudinal position, the end longitudinal position and an identifier of the associated dataset are stored to a table of a dataset that is to be subsequently written to the magnetic recording tape.

In another general embodiment, a computer-implemented method includes receiving a plurality of records, storing datasets associated with the plurality of records in a buffer memory, and writing the datasets stored in the buffer memory to a magnetic recording tape in response to a predetermined number of datasets being stored in the buffer memory. For each of the datasets being written, an end longitudinal position indicative of a physical position where the dataset is physically written to the magnetic recording tape is determined. Moreover, for each determined end longitudinal position, the end longitudinal position and an identifier of the associated dataset are stored to a table of a dataset that is to be subsequently written to the magnetic recording tape.

In another general embodiment, a computer program product for buffered writing of datasets and end longitudinal positions on a magnetic recording tape and validating the end longitudinal positions during reading of a later dataset thereafter includes a computer readable storage medium having program instructions embodied therewith. The program instructions are readable and/or executable by a controller to cause the controller to perform the foregoing method.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
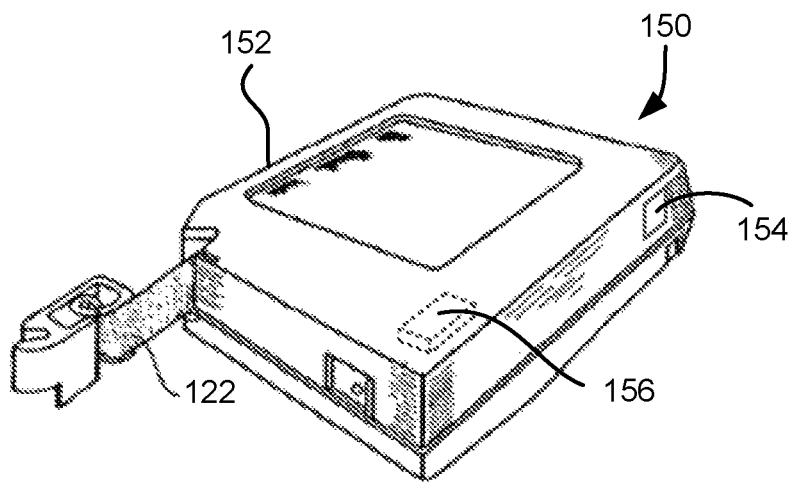
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
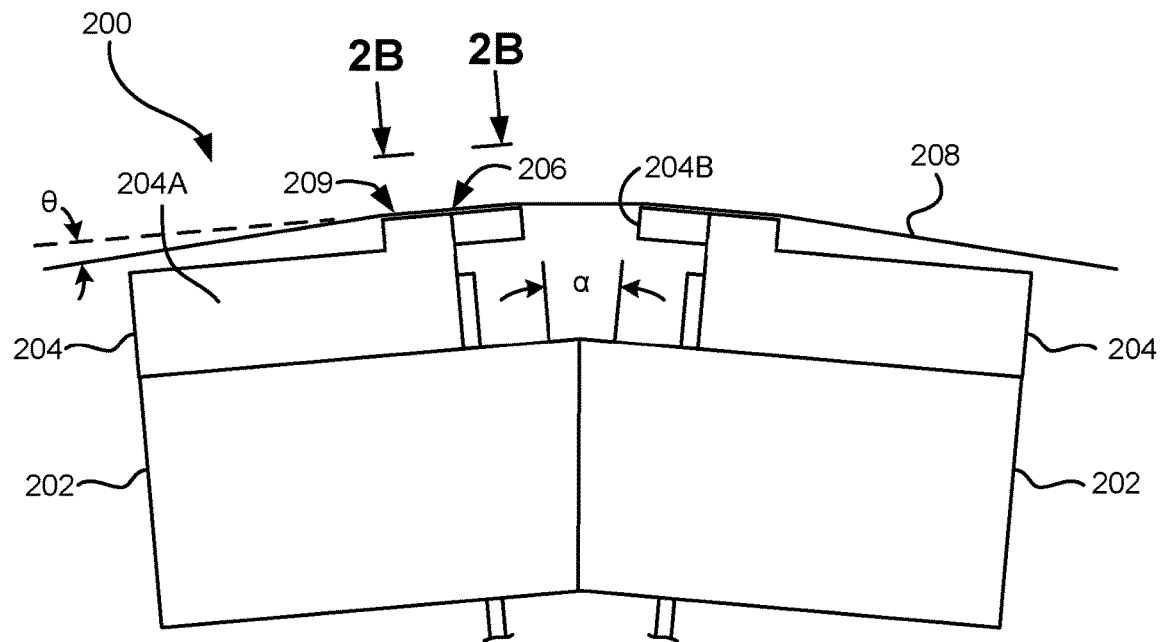
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
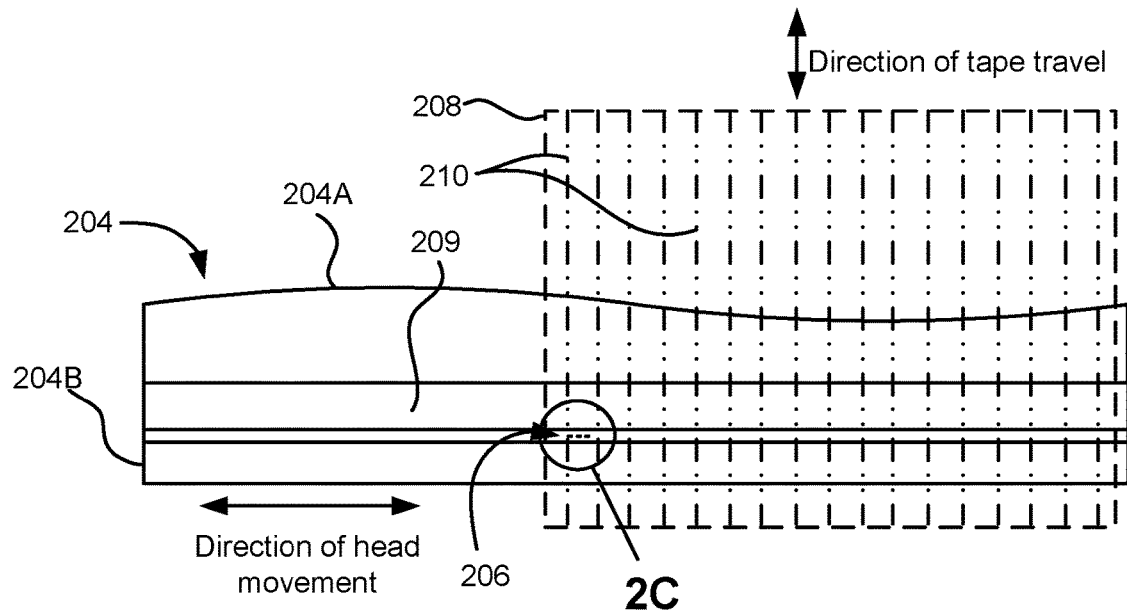
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
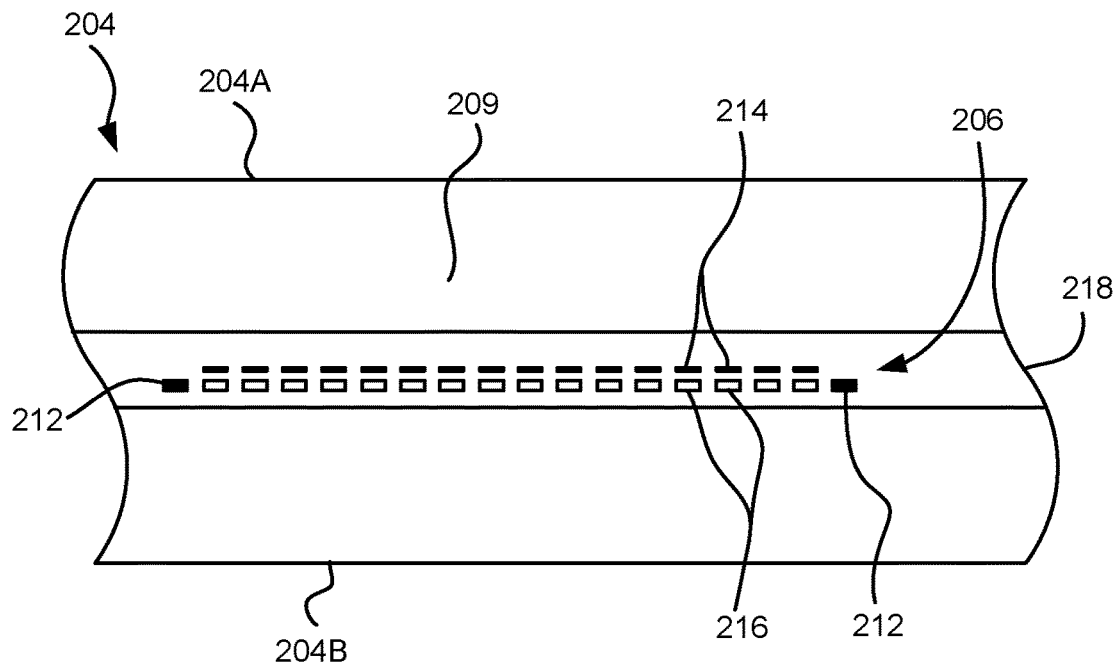
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
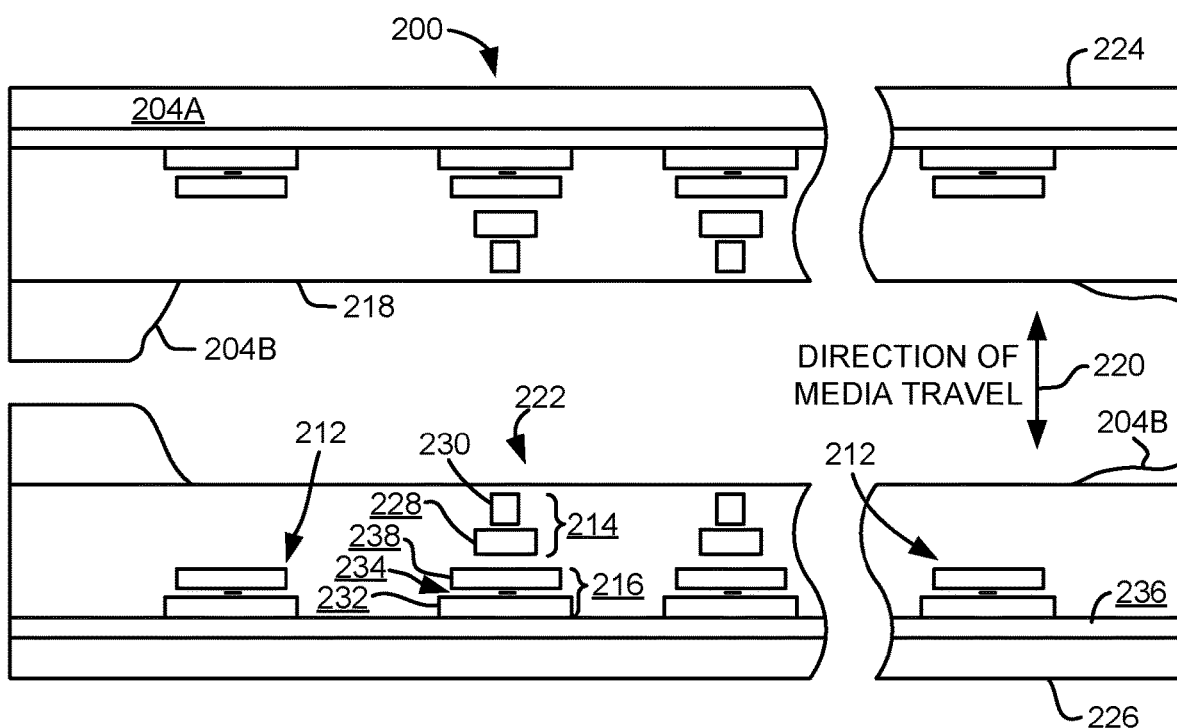
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
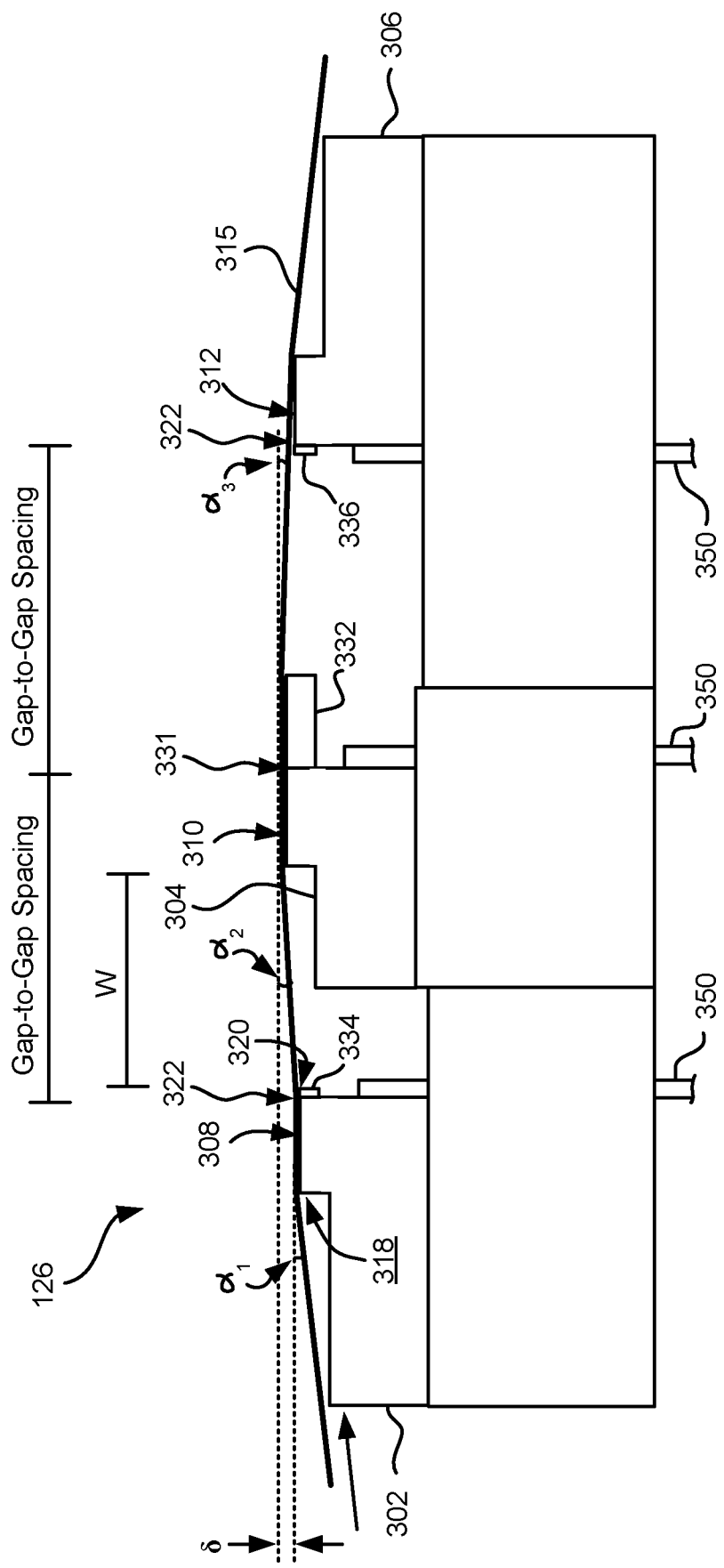
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
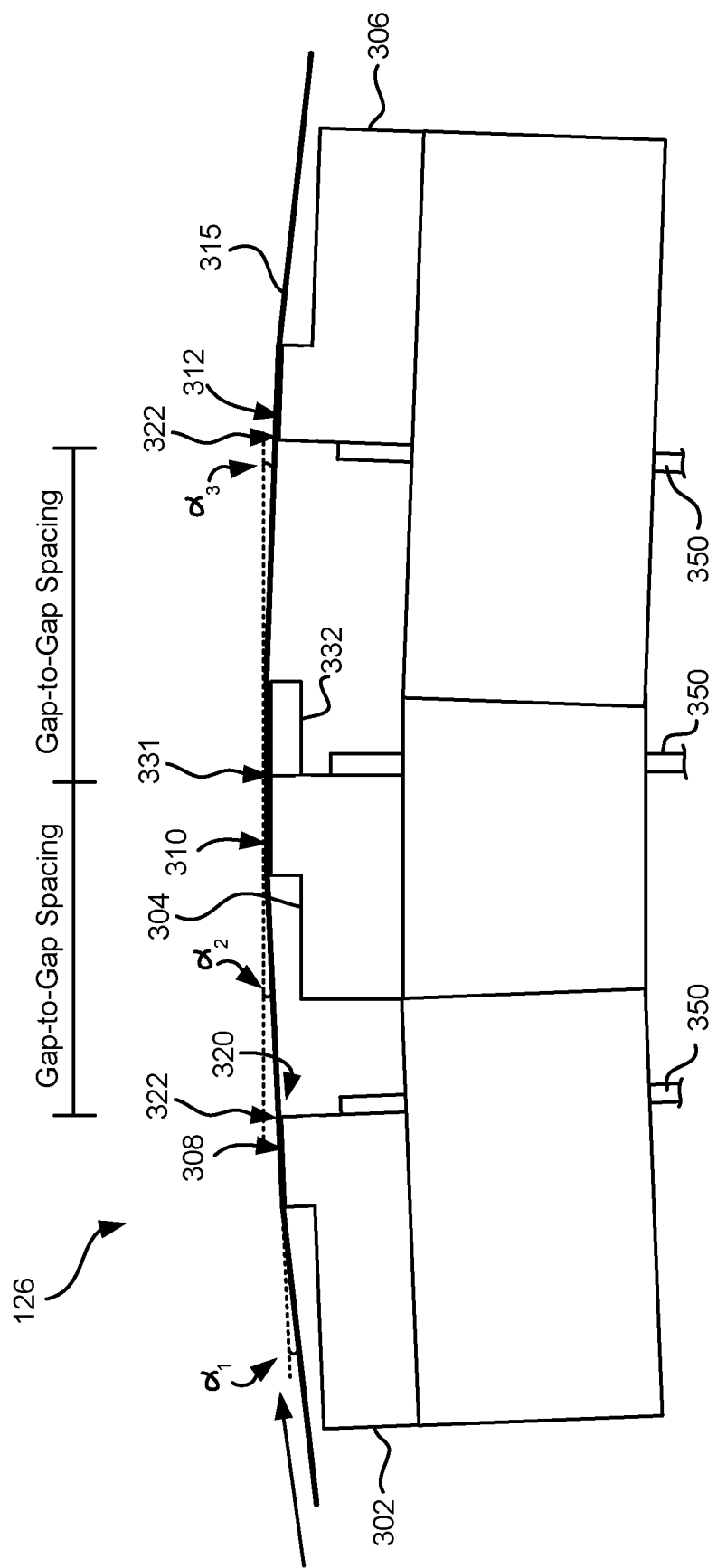
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
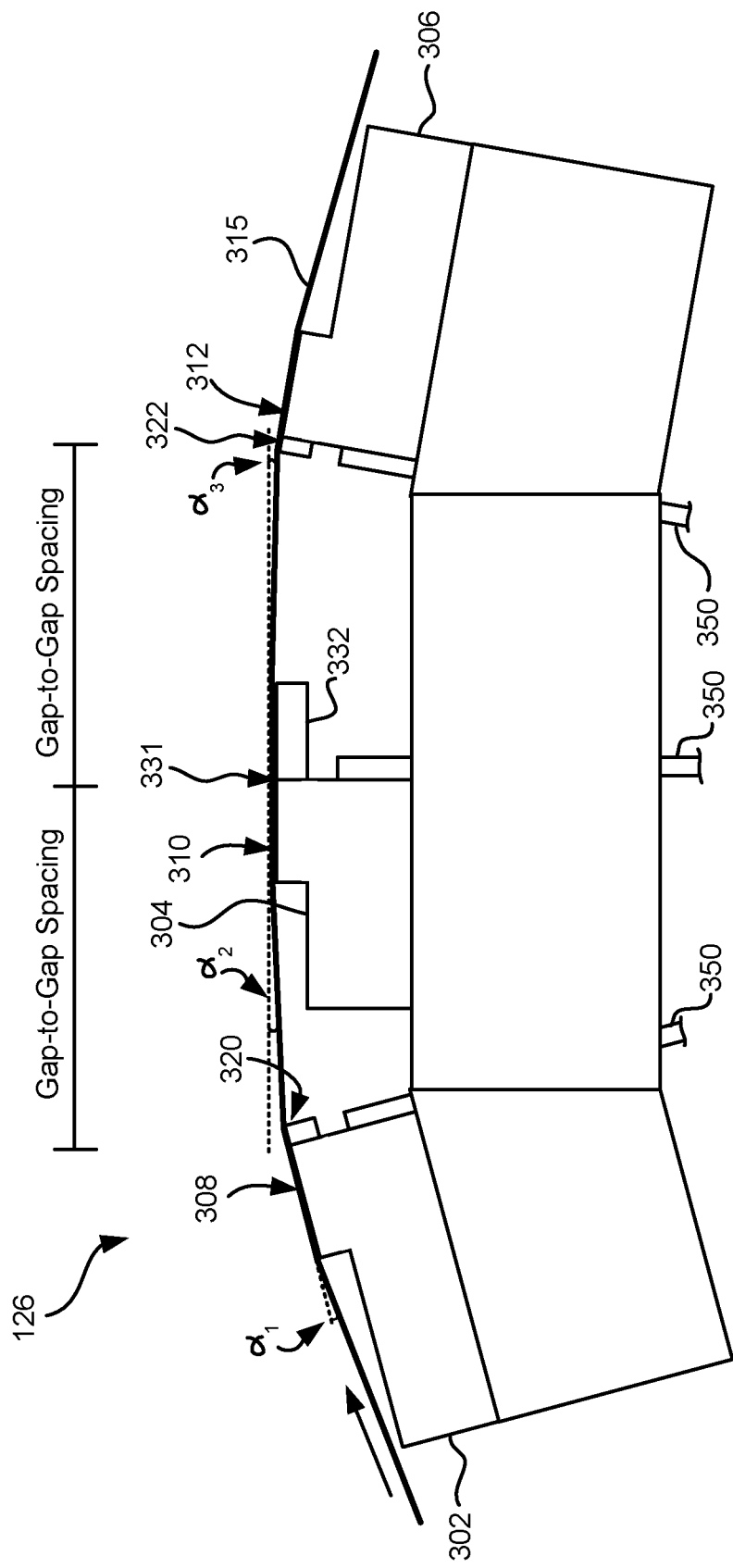
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
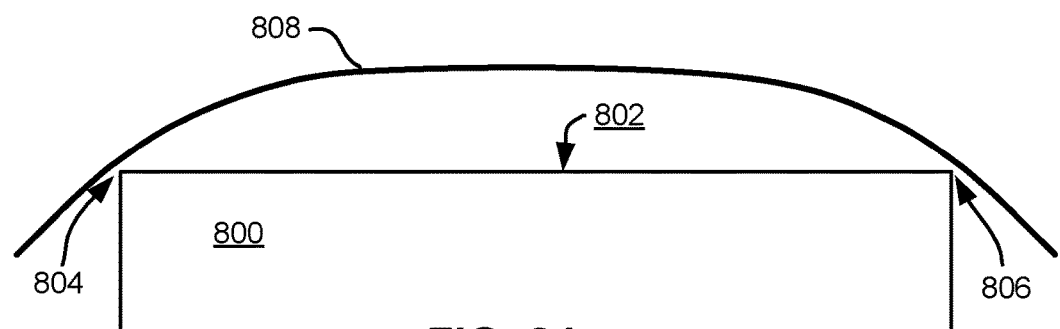
FIGS. 8A-8C are schematics depicting the principles of tape tenting.
Figure 8B:
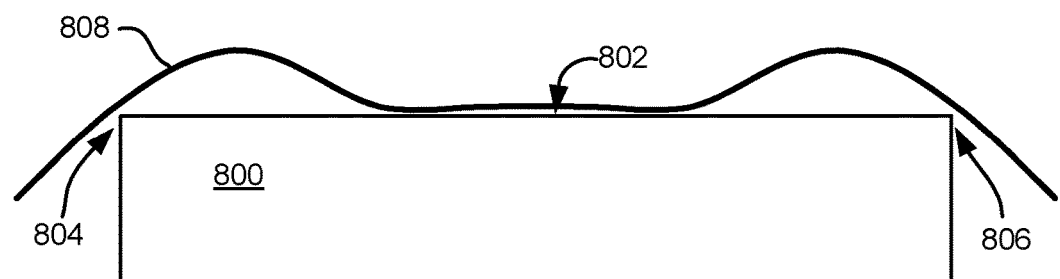
Figure 8C:
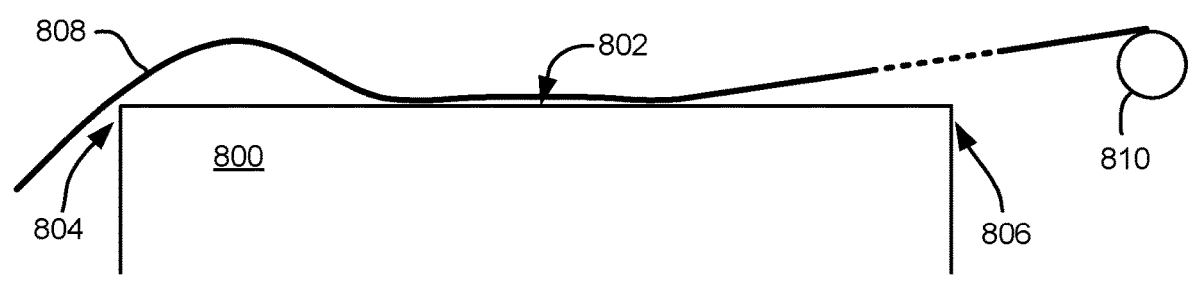

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
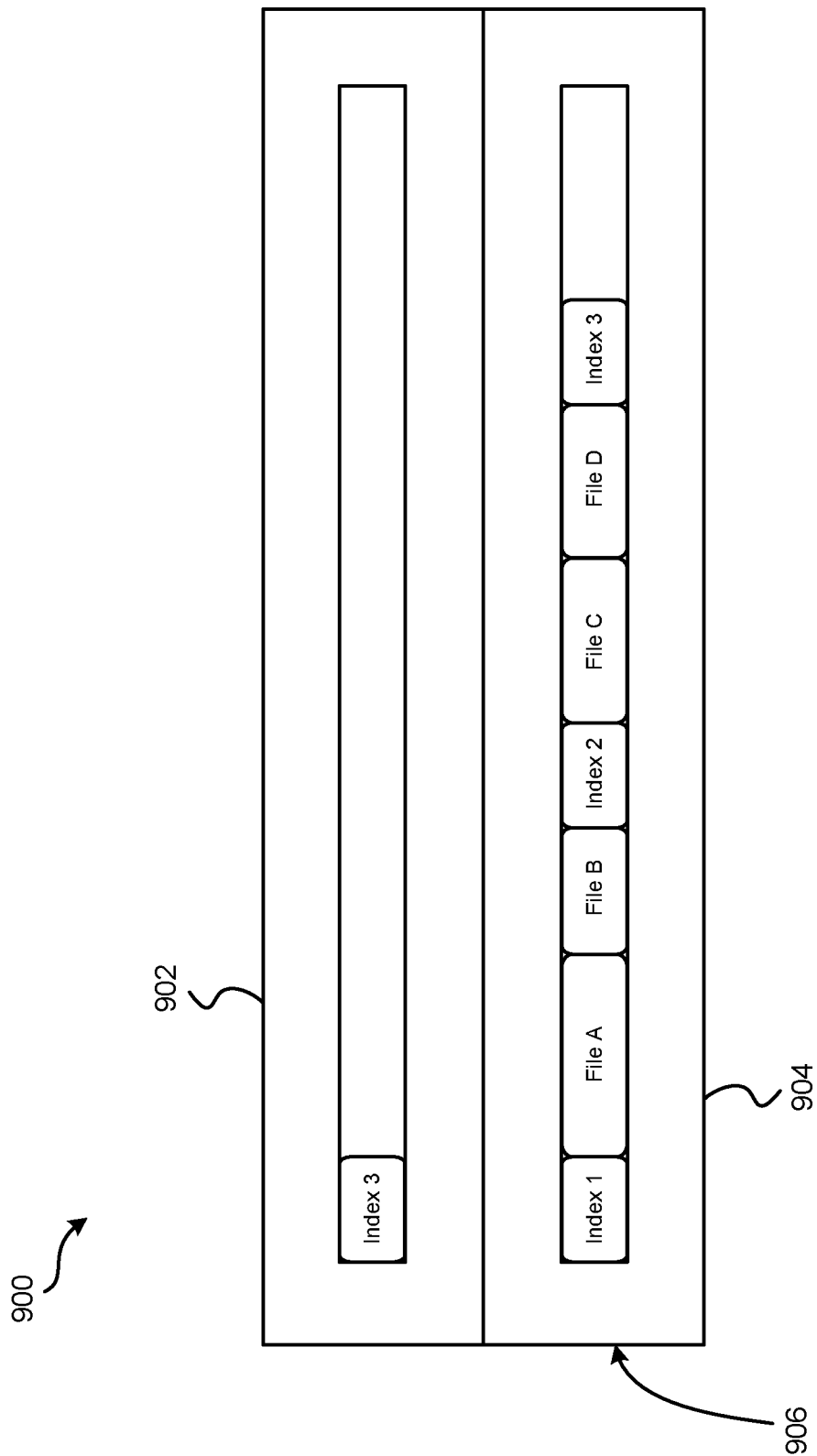
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Data is typically written to a magnetic recording tape in a linear format. In such a format, the magnetic recording tape is logically divided into a plurality of areas, i.e., wraps, in a tape width direction, and data is recorded on each wrap longitudinally on the tape from a beginning of the tape to an end of the tape, or from the end of the tape to the beginning of the tape. A valid tape widthwise extent of each wrap on which data is to be written is typically referred to as a track width (generally corresponding to track pitch $W_{tp}$). More specifically, data tracks are typically recorded on tracks on even numbered wraps of a magnetic recording tape as the magnetic recording tape is advanced in a forward direction, e.g., from the beginning of the tape to the end of the tape, and on tracks on odd numbered wraps as the magnetic recording tape is advanced in a backward direction, e.g., from the end of the tape to the beginning of the tape.

When writing data, a host may issue a locate command specifying a record position where new data is to be written on a magnetic recording tape. In response to receiving the command, a tape drive may move the magnetic recording tape to a record position (traverse the magnetic recording tape relative to a magnetic head of the tape drive). Thereafter, the host may issue a write command for causing data that is to be written to be sent to the tape drive. A unit of data that is to be written from the host to the tape drive is typically referred to as a "record," and a unit of data that is to be written to the magnetic recording tape is typically referred to as a "dataset." A size of a record is in some approaches specified by the host. For example, some LTFS systems write data in units of 512 Kilobyte (KB) records. The written records may be compressed in the tape drive and then organized into units of datasets in a buffer of the tape drive. The size of a dataset may be determined in accordance with the format of the magnetic tape. For example, in some tape drive structures, a dataset includes 5 Megabytes (MB) of data.

Figure 10:
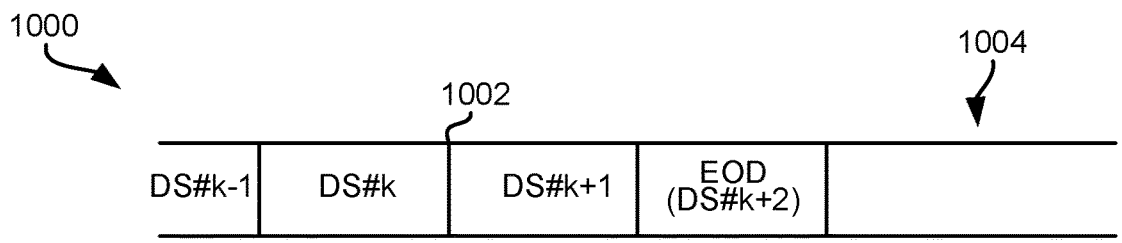
FIG. 10 is a portion of a magnetic recording tape, in accordance with one embodiment.

Upon a predetermined number of datasets accumulating in the buffer, the tape drive may write the datasets onto the magnetic recording tape. Moreover, in response to a predetermined amount of time elapsing after the last of the data is written to the magnetic recording tape, and/or in response to the tape drive receiving a command requesting the magnetic recording tape be advanced to another position (relative to the magnetic head), the tape drive may perform a write operation of a dataset called an "End Of Dataset" (EOD). An EOD indicates that no data is present after the indicated position in the particular partition on the magnetic recording tape and/or on the rest of the magnetic recording tape 1002. For purposes of a non-limiting example, with reference now to FIG. 10 representation 1000 illustrates, logically, a portion of a magnetic recording tape 1002 that includes several datasets, e.g., DS #k−1, DS #k, DS #k+1 and EOD, written thereon. Note that following the EOD, a section 1004 of the magnetic recording tape 1002 does not include any data of the dataset DS. Information associated with the EOD, e.g., such as a relative position of the EOD on the magnetic recording tape 1002, may be stored in a cartridge memory of a tape cartridge that includes the magnetic recording tape 1002, for allowing the magnetic recording tape 1002 to thereafter be advanced by the tape drive to a position of the EOD in response to receiving a command from the host, e.g., a space EOD command. Because the EOD is a last position of user data in the particular partition on the magnetic recording tape 1002, by referencing such information in the cartridge memory, a location to resume writing on the magnetic recording tape 1002 may be determined.

One or more of the datasets may be divided into a plurality of codeword objects. In some formats of data storage using magnetic recording tape, datasets may be divided into 192 codeword objects. These codeword objects may be written in parallel by an array of write heads, e.g., 32 write heads, 64 write heads, etc. Each codeword object may include a header containing general information about the dataset to which the codeword object belongs.

As previously mentioned elsewhere above, for writing a new record from a record position, the host may issue a locate command that instructs the tape drive to advance the magnetic recording tape to the target record position. In order to write a new record after the last written record, the host may issue a command, e.g., a space EOD command, that instructs the tape drive to advance the magnetic recording tape to the EOD position.

A physical position on a magnetic recording tape may be represented in units called "Longitudinal Position" (LPOS). To determine whether a dataset contains a designated record, the dataset is read. Specifically, part of a dataset preferably includes information called a dataset information table. The size of a dataset information table may depend on the approach, however for context in some approaches a dataset information table may comprise 932 bytes. In some approaches a dataset information table may include a "Total Records" field, which specifies a number of the records contained from a beginning of a magnetic recording tape to a previous dataset, e.g., a most recently written dataset. Moreover, the dataset information table may include a "Record Count" field, which specifies a number of records contained in a present dataset. One or more of such fields may be referenced to determine whether the respective dataset contains the designated record.

In response to a record number of a record that is to be located (target record) being designated, a tape drive may advance a magnetic recording tape to a roughly estimated position, e.g., using information from a tape directory which stores record number information of the records written at a beginning and an intermediate position of the tape. Thereafter, a dataset is read from the estimated position on the magnetic recording tape to determine whether the dataset contains the target record. Upon determining the location of the dataset containing the target record, the tape drive stops the magnetic recording tape at that position, and waits until data writing operation instructions are received.

A physical position of the last of a dataset on the magnetic recording tape is called end LPOS. In some approaches, writing may begin only upon the end LPOS of a previous dataset being confirmed, e.g., only upon a state of the end LPOS being determined to be valid, so as not to overwrite preceding valid user data. In response to such confirmation, the tape drive may begin writing the new dataset from the position corresponding to the end LPOS of the previous dataset +1. For context, in some preferred approaches the "+1" of the "previous dataset +1" represents one LPOS unit past the position of the end LPOS on the magnetic tape, although in other approaches, the unit of the shift from the previous dataset may be any known type of unit. Depending on the direction of writing, the +1 shift may be in a direction toward the beginning of the magnetic tape, or in a direction toward the end of the magnetic tape.

On the other hand, data may be read even when the end LPOS of the previous dataset has not been confirmed. For example, according to one approach, a logically estimated LPOS of the previous dataset may be obtained on an assumption that the previous dataset has been written in a highly efficient manner, e.g., none or a negligible amount of variance in the writing. Accordingly, an estimate of the end LPOS of the previous dataset may be calculated by adding the estimated LPOS to the end LPOS of the dataset one before the previous dataset, and the calculated value may be set as a temporary (estimated) end LPOS of the dataset. However, upon a series of datasets each having an estimated end LPOS being read in series, a later dataset in the series may become unreadable due to error gradually accumulating between the estimated end LPOSs and the actual end LPOSs of datasets, e.g., see FIG. 11.

Some specifications of tape drives specify that a writing of a dataset must be completed within four meters of magnetic tape from the end LPOS of the previous dataset. To conform to this specification, in response to a dataset not being able to be written within four meters from the end LPOS of the previous dataset, e.g., due to a faulty status of the tape drive during the write operation, due to a faulty status of the magnetic tape during the writing operation, etc., a hardware interrupt may be generated to forcibly terminate the write operation. Even if such an interrupt is not generated in time to prevent the four meter limit, the tape drive may obtain the end LPOS after writing the dataset, and in response to the write spanning four meters or more from the previous end LPOS, the writing operation may be terminated. Regardless of the cause of the dataset not being written within four meters from the end LPOS of the previous dataset, error recovery procedures may be performed. According to one approach, such error recovery procedures may include rewinding the magnetic tape to the end LPOS of the previous dataset, and writing the current dataset again.

Figure 11:
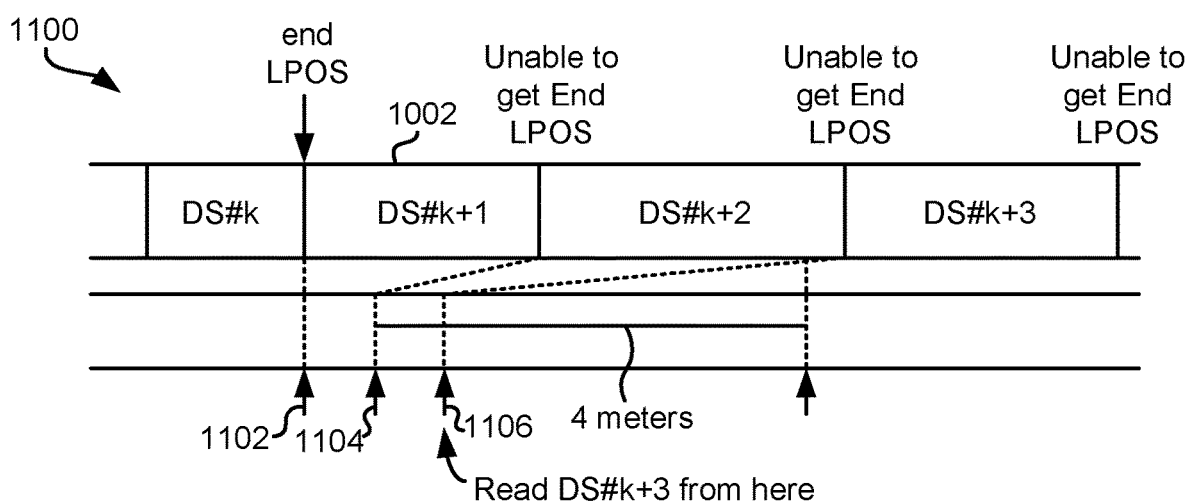
FIG. 11 is a portion of a magnetic recording tape, in accordance with one embodiment.

As illustrated in representation 1100 of FIG. 11, in some cases, where multiple datasets, e.g., DS # k+1 and DS # k+2, are read continuously with the end LPOS of each of such datasets being unreadable, e.g., see Unable to get end LPOS, the dataset that is to be read may have previously been written outside a range from the estimated end LPOS to the estimated end LPOS+4 meters. For example, note that in representation 1100, the dataset that is to be read, i.e., DS # k+3, resides in a range from an estimated end LPOS 1104 of DS # k+1 to four meters beyond the estimated end LPOS. In this case, it may be assumed that repeating the read of the ERP in the same range does not succeed in reading the target dataset. Accordingly, while a state 1102 of the end LPOS of DS # k may be determined to be valid, end LPOSs 1104, 1106 of datasets DS # k+1 and DS # k+2 remain estimated. Moreover, the dataset DS # k+3 remains unread.

Figure 12:
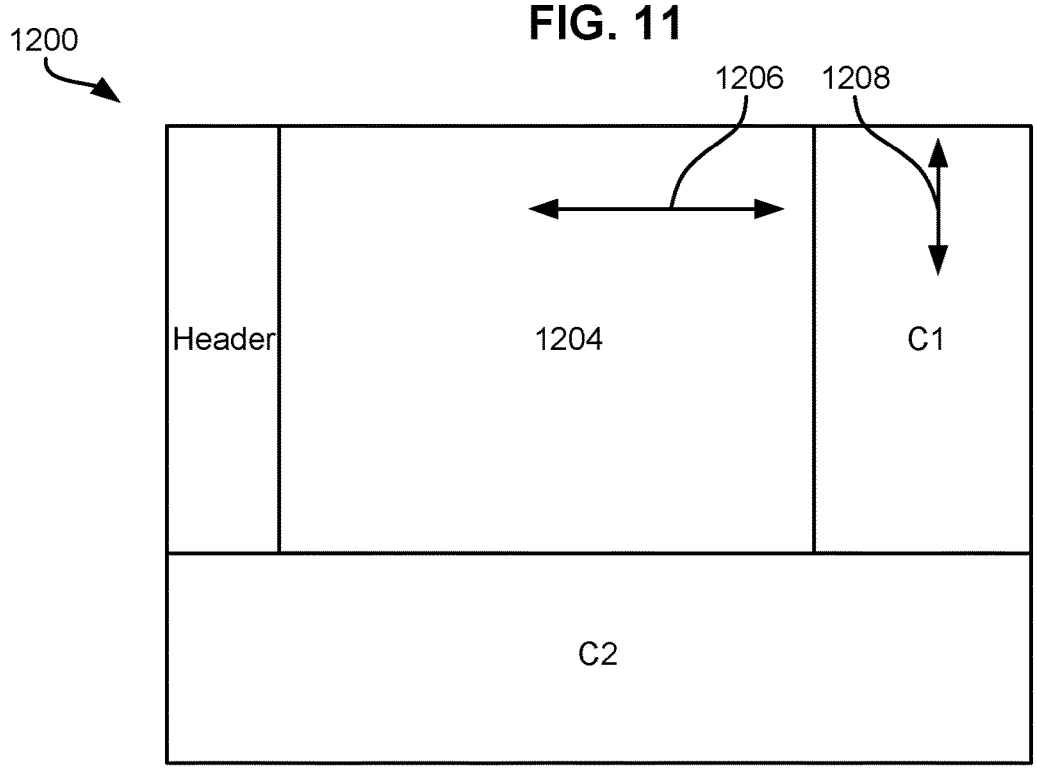
FIG. 12 is an assembly structure of data and error correction code, in accordance with one embodiment.

The data constituting a dataset may be protected at least in part by a two-dimensional error correction code according to any known technique. For example, FIG. 12 illustrates a logical data structure 1200 resulting from processing data received from a host and addition of error correction code thereto, according to one approach. Specifically, in the present approach, data received from the host is stored in a horizontal direction 1206 in the user data area 1204 until a predefined amount of data has been stored. Thereafter, a first error correction code C1 is added in the C1 portion. In response to a predefined number of C1 data rows being assembled, a second error correction code C2 is added to the data aligned in the vertical direction 1208 in the C2 portion. In some formats of LTO, for each data row, a set of 936 bytes of user data and a 12 byte header is added with a 48 byte C1 error correction code to create each row in the data structure 1200. Each vertical 84 byte column of the header, the user data, or the C1 error correction code is added with a 12 byte error correction code C2 to create each column in the data structure 1200. It should be noted that any of these specifications, e.g., 936 bytes, 12 byte, 48 byte, and 84 byte, may be different in one or more different tape formats.

For any number of reasons and/or based on any number of factors, e.g., the condition of the tape head, the condition of the magnetic recording tape, etc., in some approaches, errors resulting from noises in the signal from the tape head are not correctable using C1/C2 error correction code. In such a case, the tape drive may perform ERP operations including, e.g., rewinding the tape in the tape drive, changing the settings of the tape drive, and rereading the dataset, in an attempt to correct the error(s).

According to another approach, an ERP operation known as "cut & paste ERP" may be performed in an attempt to recover from error(s). In this operation, while changing the settings of the tape drive during an ERP operation, data rows that have been successfully error corrected with the C1 error correction codes may be stored by the tape drive in a different/predetermined area of the buffer. Cut & paste ERP is particularly useful for recovering data when the tape medium exhibits tape lateral expansion or contraction after data has been written thereon due to known factors such as absorption or desorption of water, creep, etc. The data tracks written on such sections of the magnetic tape may not long align with the array of readers attempting to read the magnetic recording tape.

FIGS. 13A-13F depict three attempts in which cut & paste ERP is performed on a portion of magnetic recording tape 1306.

More specifically, FIG. 13A illustrates a first attempt of a tape drive to read a portion of a magnetic recording tape 1306, during which only some of the data rows 1302 written on the portion are successfully read. Accordingly, error is experienced during reading of the portion of the magnetic tape 1306, e.g., see unsuccessfully read portions 1300. In order to mitigate the errors, e.g., by making the unsuccessfully read portions 1300 of the portion of a magnetic recording tape 1306 recoverable, cut & paste ERP may be performed. Referring now to FIG. 13B, an operation of cut & paste ERP may include storing the data rows successfully read in the first attempt of FIG. 13A, in a copy and paste buffer 1304.

In the present approach, prior to a second attempt at reading the portion of the magnetic recording tape 1306, the tape may be rewound, and settings of the tape drive reading the portion of the magnetic recording tape 1306 may be changed. Thereafter, referring now to FIG. 13C, the cut & paste ERP may include performing a second attempt at reading the portion of the magnetic recording tape 1306. As illustrated in FIG. 13C, several data rows 1308 written on the portion of the magnetic recording tape 1306 that were unsuccessfully read in the first reading attempt (of FIG. 13A), are successfully read in the second attempt. For example, with joint reference to FIGS. 13A and 13C, it may be noted that data rows 1308 of FIG. 13C are successfully read in the second reading attempt, while the data rows 1308 were previously unsuccessfully read in the first attempt represented by FIG. 13A, e.g., see unsuccessfully read portions 1300.

Referring now to FIG. 13D, the data rows 1308 successfully read in the second read attempt of FIG. 13C are stored in the copy and paste buffer 1304 containing the data rows successfully read in the read attempt of FIG. 13A, e.g. see the arrow between FIGS. 13B and 13D inferring the consolidation of successful reads.

Referring now to FIG. 13E, prior to a third attempt at reading the portion of the magnetic recording tape 1306, the tape may be rewound again, and settings of the tape drive may be again changed. Thereafter, a third attempt at reading the portion of the magnetic recording tape 1306 may be performed. In such an attempt, as illustrated in FIG. 13D, two data rows 1310 written on the portion of the magnetic recording tape 1306 that were unsuccessfully read in the first and second reading attempts, are successfully read.

In FIG. 13F, the data rows 1310 successfully read in the third attempt of FIG. 13E are stored in the copy and paste buffer 1304 that contains the data rows 1302, 1308 successfully read in the read attempts of FIGS. 13A and 13C. In the present approach, the remaining data rows of the portion of the magnetic recording tape 1306 remaining unsuccessfully read after performing the cut & paste ERP illustrated in FIGS. 13A-13F may be determined to be unreadable, and may be recovered using C2 error correction code.

Figure 14A:
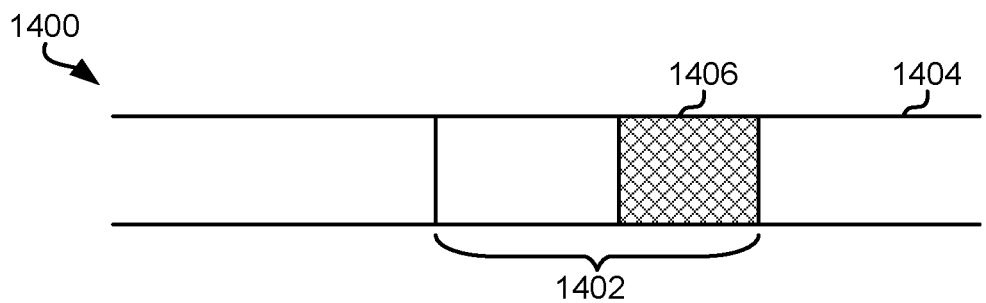
FIGS. 14A-14C depict a logical representation of a portion of a magnetic recording tape having a dataset with errors, in accordance with one embodiment.
Figure 14B:
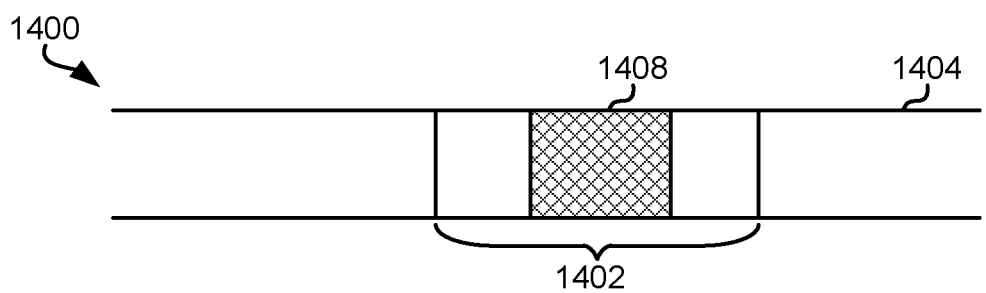
Figure 14C:
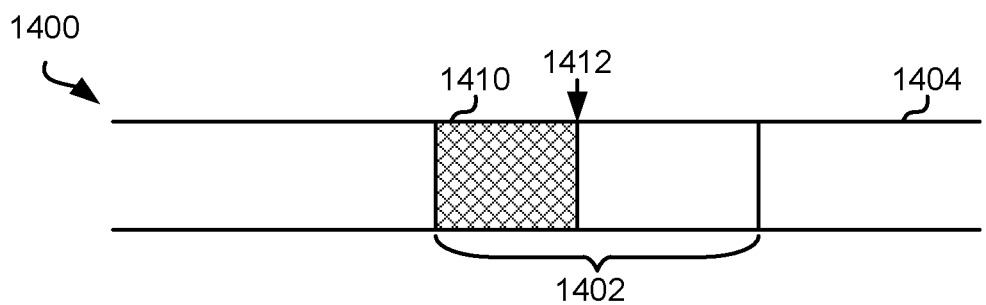
Figure 14D:
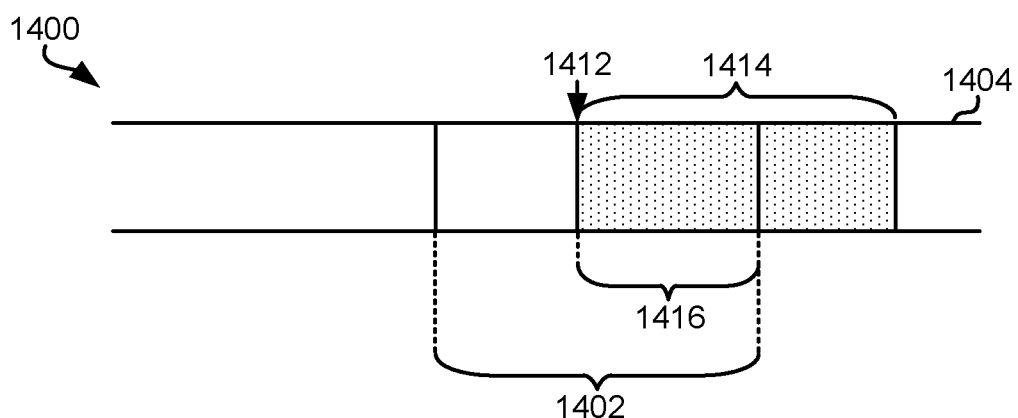
FIG. 14D depicts the portion of the magnetic recording tape of FIGS. 14A-14C with overwriting as a result of a problem with the error recovery procedure attempting to recover from the errors.

As illustrated in representation 1400 of FIGS. 14A-14D, conventional cut & paste ERP may in some approaches result in overwriting data, which renders the overwritten data unreadable. For purposes of an example, assume that errors, e.g., such as errors caused by noise, exist in a dataset 1402 written on a portion of a magnetic recording tape 1404. ERP operations are performed in an effort to recover the data. For example, assume that three ERP operations are performed sequentially on sections 1406, 1408, 1410 of the dataset 1402 in FIGS. 14A-14C. In the current approach, a position 1412 of the last codeword object obtained by the last ERP operation, i.e., an end LPOS determined by the ERP operation performed in FIG. 14C, is used as the end LPOS of the dataset 1402. However, based on the incorrectly assumed position 1412 of the end LPOS, upon a next write command being issued for a next dataset 1414, as illustrated in FIG. 14D, the dataset 1402 is partially overwritten by a portion 1416 of the dataset 1414. Data of the overwritten portion of the dataset 1402 cannot be read back subsequent the overwriting.

It should be noted that recording an end LPOS position of a last codeword object obtained by each ERP operation does not mitigate the issues described in FIGS. 11 and 14A-14D. More specifically, the information in a codeword object obtained without completing C2 error correction is typically unreliable. For example, there is a potential for inadvertently picking up a codeword object recorded on an adjacent wrap or erroneously picking up a codeword object located at a distant portion of the magnetic recording tape. In sharp contrast, various embodiments and approaches described herein include buffered writing of datasets and end LPOSs on a magnetic recording tape and validating the end LPOSs during reading of a later dataset thereafter, for avoiding such issues.

Figure 15A:
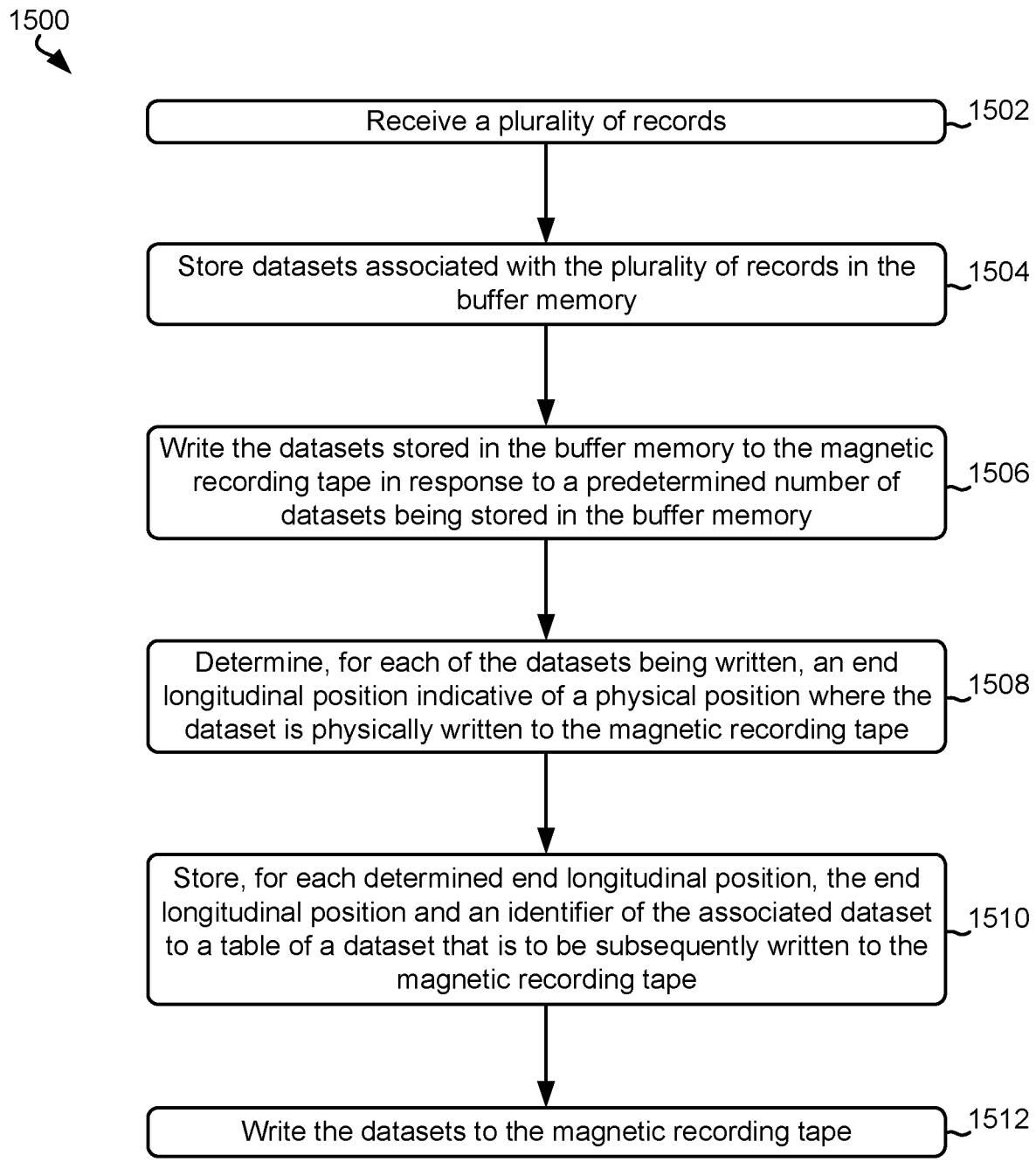
FIG. 15A is a flowchart of a method, in accordance with one embodiment.

Now referring to FIG. 15A, a flowchart of a method 1500 is shown according to one embodiment. The method 1500 may be performed in accordance with the present invention in any of the environments depicted in FIGS. 1-14D, and 16 among others, in various embodiments. Of course, more or fewer operations than those specifically described in FIG. 15A may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art.

Operation 1502 of method 1500 includes receiving a plurality of records. Depending on the approach the records may be received from any source, e.g., from a host, from a local storage device, etc. Moreover, the plurality of data records may be received for any reason, e.g., as new incoming data, as data that is part of a data migration process, as data that is being duplicated, etc.

The plurality of records may have datasets associated therewith. According to some approaches, the datasets associated with the plurality of records are stored, e.g., see operation 1504 of method 1500. Depending on the approach, the datasets may be stored at any one or more location(s), although in the current embodiment, the datasets associated with the plurality of records are stored in a buffer memory, e.g., such as in a buffer memory of a tape drive. At least some of the datasets may in some approaches have a predetermined size in the buffer memory. In one or more of such approaches, as the datasets are stored in the buffer memory, in response to a determination that a dataset is greater than the predetermined size, the dataset may be stored as more than one dataset.

In response to a predetermined number of datasets being stored in the buffer memory, the datasets stored in the buffer memory are written to a magnetic recording tape, e.g., see operation 1506 of method 1500. The predetermined number of datasets may be any number of datasets, e.g., one dataset, five datasets, one hundred datasets, etc. According to some approaches, method 1500 may include generating error correction code, e.g., C1 error correction information, C2 error correction information, etc., for each dataset, for a group of datasets, etc. Known error correction encoding techniques may be used. Such error correction code may be generated and incorporated into the write operation(s) of the datasets as the datasets are written to the magnetic recording tape.

For each of the datasets being written, an end LPOS indicative of a physical position where the dataset is physically written to the magnetic recording tape may be determined, e.g., see operation 1508. Because data is typically written to a magnetic recording tape in a linear format, an end LPOS of a given dataset may not be known/able to be determined until a write operation of the given dataset is completed. Accordingly, in the current approach, the end LPOS of a given dataset may be determined after the given dataset is written to the magnetic recording tape. In some other approaches, operation 1508 of method 1500 may include estimating the end LPOS of a given dataset during and/or prior to writing of the given dataset on the magnetic recording tape.

The end LPOS may be determined using any one or more known techniques. In the current version of LTO, the LPOS on magnetic tape is embedded into the timing-based servo format by modulating the positions of magnetic transitions during the servo-writing process by the magnetic tape manufacturer. Accordingly, the LPOS of the last-written codeword object of a given dataset may be retrieved from the track following servo system, e.g., the LPOS of the end of the codeword object written at the last/end portion of the given dataset. It should be noted that end LPOS information of a codeword object written at the last/end portion of the given dataset has heretofore conventionally not been actively used for reading each dataset. Accordingly, the inventive concepts disclosed in various embodiments and approaches described herein, e.g., particularly using such information, proceed contrary to conventional wisdom. As described in greater detail elsewhere herein, such information is preferably stored in records after it is retrieved, e.g., see operation 1510.

For each determined end LPOS, the end LPOS and an identifier, e.g., dataset number, of the associated dataset may be stored to a table of a dataset that is to be subsequently written to the magnetic recording tape, e.g., see operation 1510. According to a more specific approach, the table of the dataset may be a dataset information table. Depending on the approach, method 1500 may include building the table if the table does not already exist when the end LPOS and an identifier of the associated dataset is ready to be stored. In an alternate approach, a table may be built for each of the datasets stored in the buffer memory.

In some preferred approaches the table is generated just prior to initiating writing of the dataset (see operation 1512), rather than when the data is stored in the buffer memory. For performance purposes, timing may be controlled such that the dataset information table is created as late as possible, e.g., such as about immediately before the writing of the dataset, independently from the timing associated with storing datasets in the buffer.

Selection of the dataset to which the end LPOS and the identifier of the associated dataset are stored to may depend on any one or more factors. According to various approaches such factors may include, e.g., a write speed of a tape drive performing the write operation(s), a speed that the magnetic recording tape is traversed during the write operation(s), the predetermined size(s) of one or more of the datasets in the buffer memory, a time that it took for the predetermined number of datasets being stored in the buffer memory, etc.

In one approach, the dataset having the table may be the next dataset to be written to the magnetic recording tape. In such an approach, the dataset having the table may be the dataset written immediately after the dataset having the end LPOS. Moreover, according to another approach, the dataset having the table may be a dataset that is not started to be written yet but will be written next.

In contrast, in some approaches, the dataset having the table may not be the next dataset to be written to the magnetic recording tape. For example, in such approaches, the dataset having the table may be a dataset beyond, e.g., to be written later than, the next dataset to be written. According to some more specific approaches, the dataset having the table may be a dataset that is a predetermined number of datasets beyond the next dataset to be written, e.g., one dataset beyond the next dataset to be written, five datasets beyond the next dataset to be written, twenty datasets beyond the next dataset to be written, etc.

The number of datasets that may end up being written between the written dataset and the dataset having the table may depend on the predetermined number of datasets that may be stored in the buffer memory before writing is initiated/triggered. However, in some other approaches, the number of datasets that may end up being written between the written dataset and the dataset having the table may not depend on the predetermined number of datasets that may be stored in the buffer memory before writing is initiated/triggered. For example, in one approach, the dataset having the table to which the end LPOS and/or the identifier of the associated dataset are stored may not be present in the buffer memory at the same time as the associated dataset. In such an example, the end LPOS and/or the identifier of the associated dataset may be stored in the buffer memory or any other memory until a dataset that is to contain such information in a table therein is determined.

In operation 1512, the datasets with the additional information (LPOS/ID) about the previously-written dataset(s) added in operation 1510 are written to the magnetic recording tape. In one approach, the writing of one or more of the datasets to the magnetic recording tape may be performed in response to a certain amount of data that is to be written to the magnetic recording tape being accumulated in the buffer memory. The writing may include converting a state of digital signals of the datasets and/or the end LPOS and/or the identifier for writing from a respective track onto the magnetic recording tape. For example, in one approach, the writing may include converting a state of digital signals of the datasets and/or the end LPOS and/or the identifier from ASIC to analog signals.

As will now be described, the end LPOS of the dataset may be verified subsequent to being written to the magnetic recording tape, e.g., such as during fulfilling a received request for a record, e.g., see operations 1514-1520 of method 1513.

Figure 15B:
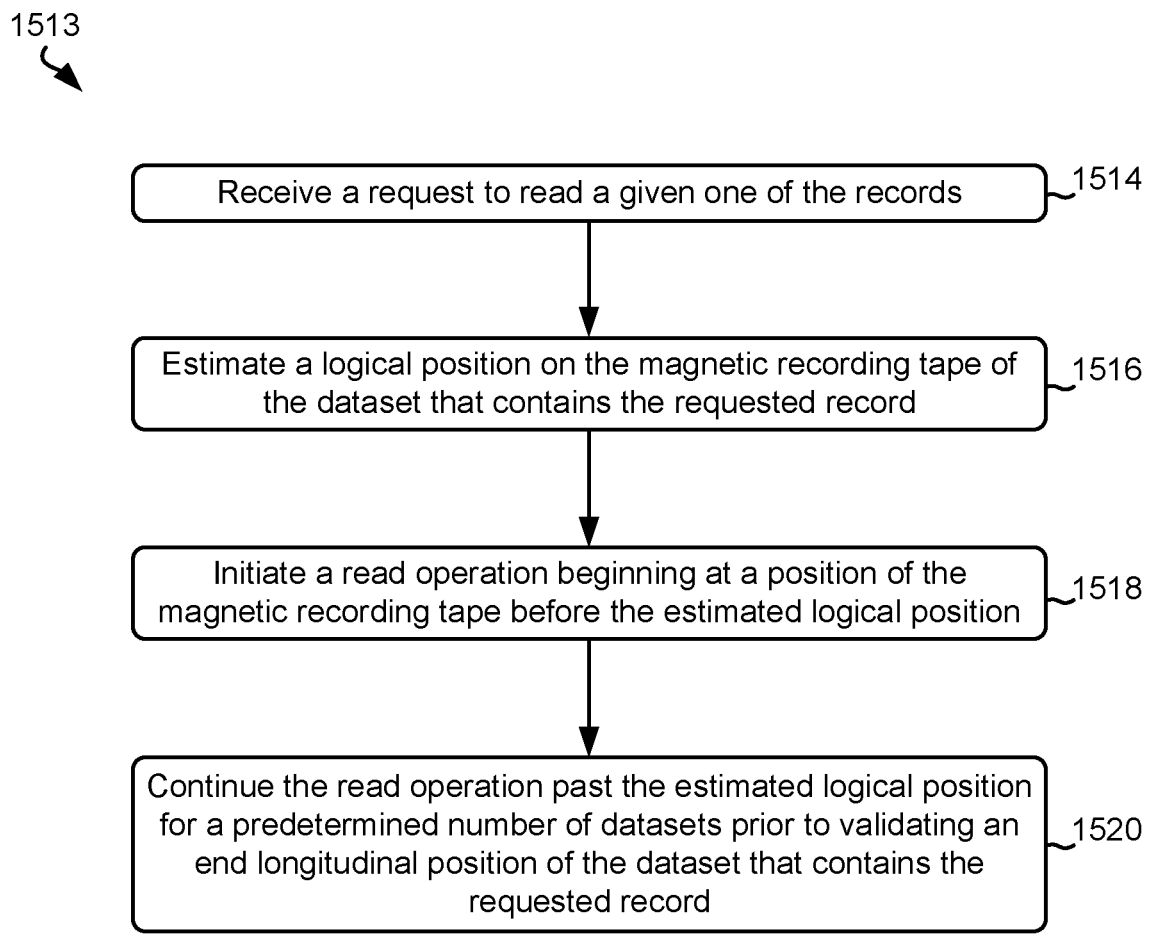
FIG. 15B is a flowchart of a method, in accordance with one embodiment.

Now referring to FIG. 15B, a flowchart of a method 1513 is shown according to one embodiment. The method 1513 may be performed in accordance with the present invention in any of the environments depicted in FIGS. 1-14D, and 16 among others, in various embodiments. Of course, more or fewer operations than those specifically described in FIG. 15B may be included in method 1513, as would be understood by one of skill in the art upon reading the present descriptions.

Each of the steps of the method 1513 may be performed by any suitable component of the operating environment. For example, in various embodiments, the method 1513 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 1513. Illustrative processors include, but are not limited to, a central processing unit (CPU), an application specific integrated circuit (ASIC), a field programmable gate array (FPGA), etc., combinations thereof, or any other suitable computing device known in the art.

Operation 1514 of method 1513 includes receiving a request to read a given one of the records. The request may be received from any source for any reason, e.g., from a user, from a host, as a part of a process such as error recovery being performed in a data storage system that contains the magnetic recording tape, etc.

A logical position on the magnetic recording tape of the dataset that contains the requested record may be estimated, e.g., see operation 1516. The logical position of the dataset that contains the requested record may be estimated using any one or more known techniques, such as retrieving position information from the tape index, metadata associated with the requested record, etc.

A read operation may be initiated beginning at a position of the magnetic recording tape before the estimated logical position, e.g., see operation 1518. The read operation may be initiated at a position of the magnetic recording tape before the estimated logical position in case that the estimated logical position of the dataset is incorrect. More specifically, as a result of initiating the read operation at a position of the magnetic recording tape prior to the estimated logical position, it is likely that the entire requested record will be read. This is important not only in terms of fulfilling the received request, but moreover to ensure that a starting LPOS of the record and/or an end LPOS of the requested record are read to allow such LPOSs to be verified with the LPOSs read thereafter in tables of a subsequent dataset, e.g., see operation 1520.

Operation 1520 of method 1513 includes continuing the read operation past the estimated logical position for a predetermined number of datasets prior to validating an end LPOS of the dataset that contains the requested record. For context, in some approaches, the predetermined number of datasets may be read in order to obtain longitudinal information that may be used for validating the end LPOS of the dataset that contains the requested record, e.g., see FIG. 15C.

Figure 15C:
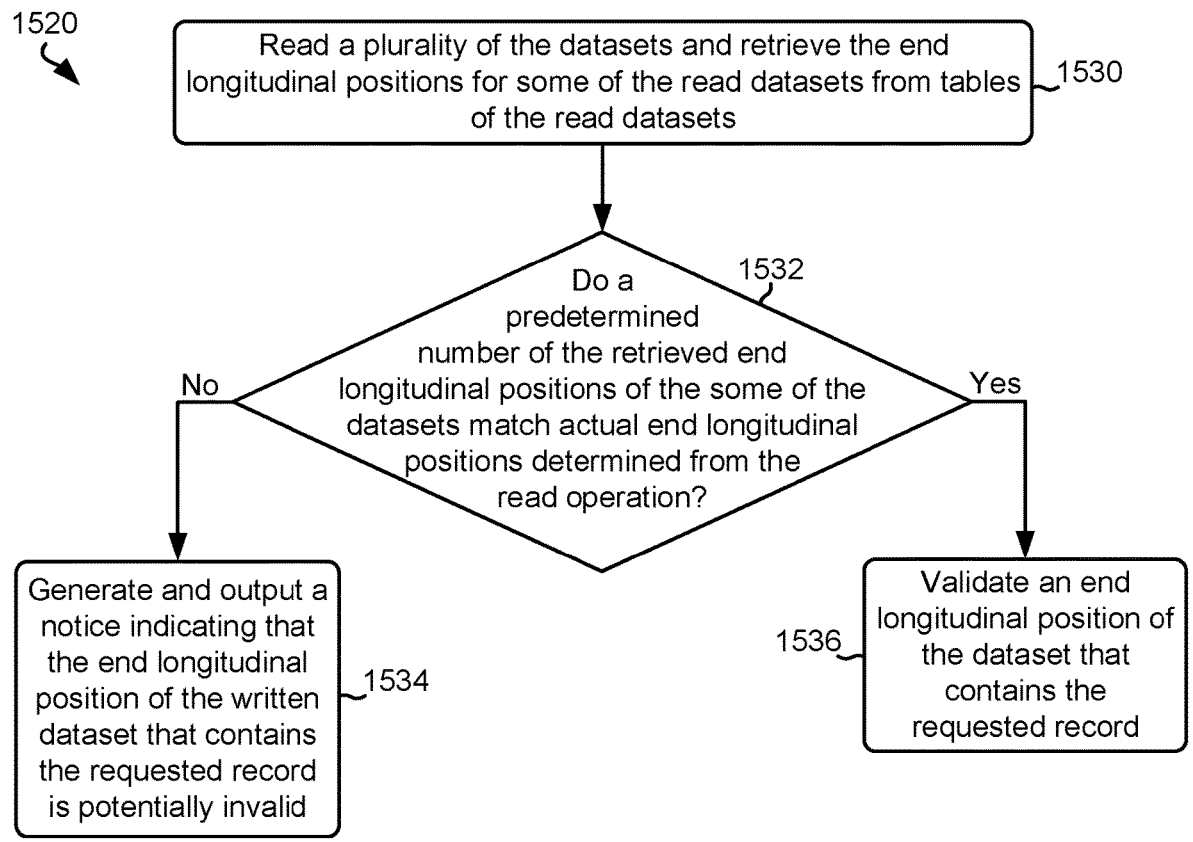
FIG. 15C is a flowchart having sub-operations of an operation of the method of FIG. 15B.

With reference now to FIG. 15C, exemplary sub-operations of method 1513 are illustrated in accordance with one embodiment, one or more of which may be used to perform operation 1520 of FIG. 15B. However, it should be noted that the sub-operations of FIG. 15C are illustrated in accordance with one embodiment which is in no way intended to limit the descriptions herein.

Sub-operation 1530 includes reading a plurality of the datasets and retrieving the end LPOSs for some of the read datasets from tables of the read datasets. For contextual purposes it should be noted that end LPOSs are likely retrieved from only some of the read datasets because the dataset of a last of the read datasets is likely stored in another dataset that is not read in the read operation.

According to some approaches, in order to validate the end LPOS of the dataset that contains the requested record, a determination may be made as to whether a predetermined number of the retrieved end LPOSs of some of the datasets match actual end LPOSs determined from the read operation, e.g., see decision 1532 of FIG. 15C. In such approaches, the more the retrieved end LPOSs match actual end LPOSs determined from the read operation, the more likely the end LPOS of the dataset that contains the requested record is accurate. Accordingly, in response to a determination that a predetermined number of the retrieved end LPOS s of the some of the datasets match actual end LPOSs determined from the read operation, e.g., as illustrated by the "Yes" logical path leading from decision 1532, the end LPOS of the dataset that contains the requested record may be validated, e.g., see sub-operation 1536. Upon being validated, in some approaches the end LPOS may be used for any read and/or write operation, e.g., such as for fulfilling the request for the record, for setting a flag in the tape metadata indicating that the end LPOS has been verified and is therefore valid, etc.

In contrast, in some approaches in response to a determination that a predetermined number of the retrieved end LPOSs of some of the datasets do not match actual end LPOSs determined from the read operation, e.g., as illustrated by the "No" logical path leading from decision 1532, the end LPOS of the dataset that contains the requested record may not be validated. According to a more specific approach, a notice indicating that the end LPOS of the written dataset that contains the requested record is potentially invalid may be generated and/or output in response to such a determination, e.g., see sub-operation 1534.

Depending on the approach, the predetermined number used in decision 1532 may be any number. For example, according to some approaches the predetermined number can be set such that only one match results in a validation. Alternatively, in some other approaches the predetermined number can be set such that all of the end LPOSs of the datasets retrieved during the read operation match the actual end LPOS s determined from the read operation. The predetermined number may additionally and/or alternatively be adjusted at any time/for any reason. For example, according to some approaches, the predetermined number may be adjusted, e.g., increased, in response to experiencing/detecting a predetermined number of read errors subsequent a validating of one or more of the end LPOSs.

It should be noted that method 1500 and/or method 1513 directly mitigate the issues discussed in reference to FIGS. 11 and 14A-14D. More specifically, error accumulation between estimated end LPOSs and actual end LPOSs and overwriting resulting from cut & paste ERP may be mitigated as a result of the buffered writing and subsequent validating of end LPOSs. Additionally, as will be described elsewhere herein, e.g., see FIG. 16, operations of method 1500 and/or method 1513 may result in relatively more condensed writing of data on a magnetic recording tape than would otherwise occur without the buffered verified writing described herein.

Figure 16:
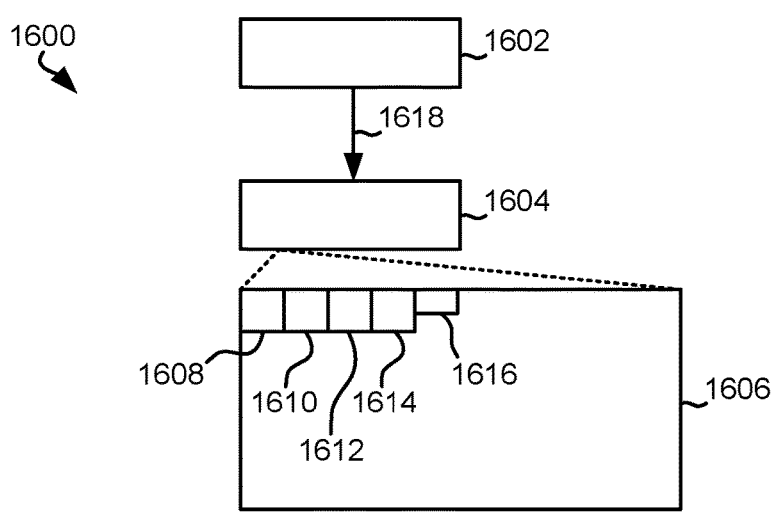
FIG. 16 is a logical representation of an environment having a host and a tape drive having a buffer memory, in accordance with one embodiment.

FIG. 16 depicts a representational architecture 1600 for buffered writing of datasets and end longitudinal positions on a magnetic recording tape and validating the end longitudinal positions during reading of a later dataset thereafter, in accordance with one embodiment. As an option, the present architecture 1600 may be implemented in conjunction with features from any other embodiment listed herein, such as those described with reference to the other FIGS. Of course, however, such architecture 1600 and others presented herein may be used in various applications and/or in permutations which may or may not be specifically described in the illustrative embodiments listed herein. Further, the architecture 1600 presented herein may be used in any desired environment.

Architecture 1600 includes a logical illustration of a host 1602 and a magnetic recording tape drive 1604. In the present embodiment, the tape drive 1604 includes a buffer memory 1606.

A plurality of records 1618 may be received from the host 1602. Datasets associated with the plurality of records may be stored in the buffer memory 1606. For example, in the present approach, three datasets 1608, 1610 and 1612 are shown stored in full in the buffer memory 1606. In the present approach it may be assumed that C1/C2 error correction code is calculated for each of the datasets 1608, 1610, 1612.

Architecture 1600 additionally includes a dataset 1614 that has been stored in the buffer memory 1606, but is awaiting calculation of C1/C2 error correction code prior to being eligible for writing to the magnetic recording tape. Moreover, the architecture 1600 includes a dataset 1616 that is in the process of being stored to the buffer memory 1606.

In some approaches, in response to a predetermined number of datasets being stored in the buffer memory 1606, the datasets stored in the buffer memory 1606 may be written to a magnetic recording tape (not shown). According to one example, assuming that the predetermined number is three datasets, the datasets 1608, 1610, 1612 may be written to a magnetic recording tape.

For each of the datasets being written to the magnetic recording tape, an end LPOS indicative of a physical position where the dataset is physically written to the magnetic recording tape may be determined, e.g., from servo information obtained during writing. Moreover, for each determined end LPOS, the end LPOS and an identifier of the associated dataset may be stored to a table of a dataset that is to be subsequently written to the magnetic recording tape. In furtherance of the example above, assuming that the datasets 1608, 1610, 1612 are to be written to the magnetic recording tape, end LPOSs indicative of a physical position where the datasets 1608, 1610, 1612 are physically written to the magnetic recording tape are determined. For each determined end LPOS of the datasets 1608, 1610, 1612, the end LPOS and an identifier of the associated dataset 1608, 1610, 1612 may be stored to a table of a dataset that is to be subsequently written to the magnetic recording tape. For example, depending on the approach, assuming that the dataset 1608 has been written first to the magnetic recording tape, the end LPOS and the identifier of the dataset 1608 may be stored to a table of any of the datasets 1610, 1612, 1614, 1616.

As described elsewhere above, in some approaches the dataset having the table may be the next dataset to be written to the magnetic recording tape. For example, assuming that the dataset 1608 is actively being written to the magnetic recording tape, the next dataset to be written to the magnetic recording tape may be the dataset 1610.

As also described elsewhere above, in some other approaches, the dataset having the table is not the next dataset to be written to the magnetic recording tape. For example, at the time when an end LPOS and identifier of a given dataset is obtained, the writing operation of the next dataset may have already begun. For example, dataset 1610 may already be in the process of being written by the time the end LPOS of dataset 1608 is obtained. Accordingly, in some approaches, the dataset having the table may be a dataset that is beyond (to be written later than) the next dataset to be written. In some approaches the end LPOS and the dataset number may be scheduled to be stored in a table of a dataset that does not yet have a table, and which is located several number of datasets behind the next dataset, e.g., three datasets behind the next dataset in one illustrative approach, in the queue of datasets to be written to the magnetic recording tape. In such an approach, the "several number of datasets" has preferably not been fixed, depending on writing condition(s). For this reason, in some approaches, an area for recording the end LPOSs of the "several number of datasets" may be reserved in the dataset information table in advance and multiple end LPOSs may be stored in the area. With continued reference to the example illustrated in architecture 1600, based on the assumption that the dataset 1608 is being actively written to the magnetic recording tape, and moreover an assumption that a table of the dataset 1612 has not yet been created, the end LPOS and identifier of the dataset 1608 may be stored to the dataset 1612, but may not be stored to the dataset 1610.

Subsequent the writing of end LPOS(s) and identifiers of one or more datasets to magnetic recording tape, a request to read a given one of the records may be received, e.g., as a locate command. In response to receiving the request to read a given one of the records, a logical position on the magnetic recording tape of the dataset that contains the requested record may be estimated. In one approach the logical position may be roughly estimated. In another approach the estimation may be based on an index of the magnetic recording tape that contains the requested record, which may include record numbers of intermediate records and the last record of each data wrap. A read operation may be initiated beginning at a position of the magnetic recording tape before the estimated logical position and continued past the estimated logical position for a predetermined number of datasets prior to validating an end longitudinal position of the dataset that contains the requested record. In one approach, after several datasets have been continuously read and end LPOSs of such datasets are retrieved from a table, states of the end LPOSs of the datasets may be set to valid.

It should be noted that in the present approach, even if the requested dataset has been reached in the read operation, reading of the datasets may continue therebeyond, e.g., without stopping the read operation. Depending on the approach, the read operation may continue beyond the requested dataset for any predetermined number of datasets, e.g., one dataset, two datasets, several tens of datasets, etc. The reading of datasets past the requested dataset may result in a relatively more accurate read performance than would otherwise result from stopping the read operation upon reading the requested dataset. This is because the next read command may likely follow continuously from the requested dataset. In one approach designated records may be extracted from the buffer in which the read datasets positioned after the requested dataset are stored. The extracted records may then be transfer to a host. Based on reading past the requested dataset, one or more end LPOSs may be verified, e.g., see FIG. 15B. This verification of dataset end LPOSs results in accurate read and write operations based on the validated accuracy of the end LPOSs, and as a result the error accumulation and overwriting discussed elsewhere above, e.g., see FIGS. 11 and 14A-14D, is avoided.

It should also be noted that performance degradation of a data storage system is avoided as a result of delaying the writing of received datasets to a magnetic recording tape until a predetermined amount of data is accumulated in the buffer. This is because performance degradation might otherwise occur in response to the tape drive having to rewind the magnetic tape to an end position of a previous dataset to rewrite data that is to be written next to the magnetic tape if such data is not timely provided before the magnetic tape is advanced ahead. As a result of not obtaining the data in such a timely manner, the dataset number of the dataset the end LPOSs of which are obtained during the writing operation differs from the dataset number of the dataset having an associated table with the former dataset number. Accordingly, depending on the tape speeds used in a tape drive, in some approaches, a delay corresponding to up to twelve datasets may occur, which results in the storing of end LPOSs of twenty or more datasets for safety, e.g., to prevent errors. However, this delay may complicate data analysis of servo systems.

In sharp contrast, various embodiments and/or approaches described herein include storing data in a buffer until a predetermined number of datasets are ready for writing. Furthermore, in such approaches, a dataset information table is generated just prior to initiating writing of the dataset, rather than when the data is stored in the buffer. For performance purposes, timing may be controlled such that the dataset information table is created as late as possible, independently from the timing associated with storing datasets in the buffer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
   a controller configured to control writing operations to a magnetic recording tape; and
   logic integrated with and/or executable by the controller for causing the controller to:
   receive a plurality of records;
   store datasets associated with the plurality of records in a buffer memory, each dataset having a dataset information table having information about the dataset;
   write the datasets stored in the buffer memory to the magnetic recording tape in response to a predetermined number of datasets being stored in the buffer memory;
   for each of the datasets being written, determine an end longitudinal position indicative of a physical position where the dataset is physically written to the magnetic recording tape;
   store at least some of the end longitudinal positions and corresponding identifiers of the associated datasets to a dataset information table of a later dataset that is to be subsequently written to the magnetic recording tape; and
   write the later dataset.

2. The apparatus as recited in claim 1, wherein the later dataset is the next dataset to be written to the magnetic recording tape.

3. The apparatus as recited in claim 1, wherein the later dataset is not the next dataset to be written to the magnetic recording tape.

4. The apparatus as recited in claim 1, the controller being configured to control reading operations of the magnetic recording tape, the logic integrated with and/or executable by the controller for causing the controller to:
   receive a request for reading a given one of the records;
   estimate a logical position on the magnetic recording tape of the dataset that contains the requested record;
   initiate a read operation beginning at a position of the magnetic recording tape before the estimated logical position; and
   continue the read operation past the estimated logical position for a predetermined number of datasets prior to validating an end longitudinal position of the dataset that contains the requested record.

5. The apparatus as recited in claim 4, wherein continuing the read operation past the estimated logical position includes reading a plurality of the datasets and retrieving the end longitudinal positions for some of the read datasets from dataset information tables of the read datasets.

6. The apparatus as recited in claim 5, the logic integrated with and/or executable by the controller for causing the controller to:
   validate an end longitudinal position of the dataset that contains the requested record in response to a determination that a predetermined number of the retrieved end longitudinal positions of the some of the datasets match actual end longitudinal positions determined from the read operation.

7. The apparatus as recited in claim 5, the logic integrated with and/or executable by the controller for causing the controller to:
   generate and output a notice indicating that the end longitudinal position of the written dataset that contains the requested record is potentially invalid in response to a determination that a predetermined number of the retrieved end longitudinal positions of the associated datasets do not match actual end longitudinal positions determined from the read operation.

8. A computer-implemented method, comprising:
   receiving a plurality of records;
   storing datasets associated with the plurality of records in a buffer memory, each dataset having a dataset information table having information about the dataset;
   writing the datasets stored in the buffer memory to a magnetic recording tape in response to a predetermined number of datasets being stored in the buffer memory;
   for each of the datasets being written, determining an end longitudinal position indicative of a physical position where the dataset is physically written to the magnetic recording tape;
   storing at least some of the end longitudinal positions and corresponding identifiers of the associated datasets to a dataset information table of a later dataset that is to be subsequently written to the magnetic recording tape; and
   writing the later dataset.

9. The computer-implemented method as recited in claim 8, wherein the later dataset is the next dataset to be written to the magnetic recording tape.

10. The computer-implemented method as recited in claim 8, wherein the later dataset is not the next dataset to be written to the magnetic recording tape.

11. The computer-implemented method as recited in claim 8, comprising:
    receiving a request for reading a given one of the records;
    estimating a logical position on the magnetic recording tape of the dataset that contains the requested record;
    initiating a read operation beginning at a position of the magnetic recording tape before the estimated logical position; and
    continuing the read operation past the estimated logical position for a predetermined number of datasets prior to validating an end longitudinal position of the dataset that contains the requested record.

12. The computer-implemented method as recited in claim 11, wherein continuing the read operation past the estimated logical position includes reading a plurality of the datasets and retrieving the end longitudinal positions for some of the read datasets from dataset information tables of the read datasets.

13. The computer-implemented method as recited in claim 12, comprising:
validating an end longitudinal position of the dataset that contains the requested record in response to a determination that a predetermined number of the retrieved end longitudinal positions of the some of the datasets match actual end longitudinal positions determined from the read operation.

14. The computer-implemented method as recited in claim 12, comprising:
generate and output a notice indicating that the end longitudinal position of the written dataset that contains the requested record is potentially invalid in response to a determination that a predetermined number of the retrieved end longitudinal positions of the associated datasets do not match actual end longitudinal positions determined from the read operation.

15. A computer program product for buffered writing of datasets and end longitudinal positions on a magnetic recording tape and validating the end longitudinal positions during reading of a later dataset thereafter, the computer program product comprising a computer readable storage medium having program instructions embodied therewith, the program instructions readable and/or executable by a controller to cause the controller to:
receive, by the controller, a plurality of records;
store, by the controller, datasets associated with the plurality of records in a buffer memory;
write, by the controller, the datasets stored in the buffer memory to the magnetic recording tape in response to a predetermined number of datasets being stored in the buffer memory;
for each of the datasets being written, determine, by the controller, an end longitudinal position indicative of a physical position where the dataset is physically written to the magnetic recording tape;
for each determined end longitudinal position, store, by the controller, the end longitudinal position and an identifier of the associated dataset to a table of a dataset that is to be subsequently written to the magnetic recording tape;
receive, by the controller, a request for reading a given one of the records;
estimate, by the controller, a logical position on the magnetic recording tape of the dataset that contains the requested record;
initiate, by the controller, a read operation beginning at a position of the magnetic recording tape before the estimated logical position; and
continue, by the controller, the read operation past the estimated logical position for a predetermined number of datasets prior to validating an end longitudinal position of the dataset that contains the requested record.

16. The computer program product as recited in claim 15, wherein the dataset having the table is the next dataset to be written to the magnetic recording tape.

17. The computer program product as recited in claim 15, wherein the dataset having the table is not the next dataset to be written to the magnetic recording tape.

18. The computer program product as recited in claim 15, wherein continuing the read operation past the estimated logical position includes reading a plurality of the datasets and retrieving the end longitudinal positions for some of the read datasets from tables of the read datasets.

19. The computer program product as recited in claim 18, the program instructions readable and/or executable by the controller to cause the controller to:
validate, by the controller, an end longitudinal position of the dataset that contains the requested record in response to a determination that a predetermined number of the retrieved end longitudinal positions of the some of the datasets match actual end longitudinal positions determined from the read operation.

* * * * *